US012657182B2

(12) United States Patent
     Liu

(10) Patent No.: US 12,657,182 B2
(45) Date of Patent: Jun. 16, 2026

(54) DATA PROCESSING METHOD AND APPARATUS BASED ON BLOCKCHAIN, DEVICE, AND MEDIUM

(71) Applicant: Tencent Technology (Shenzhen) Company Limited, Guangdong (CN)

(72) Inventor: Qucheng Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/527,704

(22) Filed: Dec. 4, 2023

(65) Prior Publication Data

US 2024/0152505 A1    May 9, 2024

Related U.S. Application Data

(63) Continuation of application No. PCT/CN2023/112029, filed on Aug. 9, 2023.

(30) Foreign Application Priority Data

Nov. 7, 2022    (CN) ......................... 202211383918.X

(51) Int. Cl.
     G06F 16/23          (2019.01)
(52) U.S. Cl.
     CPC ................................ G06F 16/2379 (2019.01)
(58) Field of Classification Search
     CPC .. G06F 16/2379; G06F 16/2372; G06F 16/23; G06F 16/20; G06F 16/00
     See application file for complete search history.

(56) References Cited

U.S. PATENT DOCUMENTS

| | | | | |
|---|---|---|---|---|
| 10,790,990 B2 * | 9/2020 | Zhang | ................... | H04L 9/3247 |
| 10,841,097 B2 * | 11/2020 | Davis | ..................... | G06Q 20/02 |
| 10,860,259 B1 * | 12/2020 | Winarski | .............. | G06F 12/121 |
| 10,868,865 B2 * | 12/2020 | Shadmon | ............ | H04L 67/1097 |

(Continued)

FOREIGN PATENT DOCUMENTS

| | | |
|---|---|---|
| CN | 113360501 A | 9/2021 |
| CN | 114255128 A | 3/2022 |
| JP | 2018-190227 A | 11/2018 |

OTHER PUBLICATIONS

International Search Report issued Nov. 4, 2023 in Application No. PCT/CN2023/112029, 9 pages.

(Continued)

*Primary Examiner* — Miranda Le

(74) *Attorney, Agent, or Firm* — ARENTFOX SCHIFF LLP

(57)          ABSTRACT

In a data processing method, storage instance mapping information is obtained based on database configuration information of a blockchain node. The storage instance mapping information indicates data mapping relationships between a plurality of database instances and data types of the plurality of database instances. At least one candidate database instance is determined from the plurality of database instances when to-be-stored blockchain data is received. The data type of each of the at least one candidate database instances is matched with a data type of the blockchain data. The blockchain data is stored to a first database instance of the at least one candidate database instance based on a data sharding strategy in the database configuration information.

20 Claims, 11 Drawing Sheets

(56)                  References Cited

U.S. PATENT DOCUMENTS

| | | | | |
|---|---|---|---|---|
| 10,901,973 | B1 | 1/2021 | Senra et al. | |
| 11,055,277 | B2 * | 7/2021 | Yang | H04L 9/0637 |
| 11,204,915 | B2 * | 12/2021 | Qiu | G06F 16/212 |
| 11,362,840 | B2 * | 6/2022 | Sun | H04L 9/3297 |
| 11,496,310 | B2 * | 11/2022 | Brown | G06F 21/6218 |
| 11,626,999 | B2 * | 4/2023 | Davis | H04L 9/0643 |
| | | | | 713/168 |
| 11,777,712 | B2 * | 10/2023 | Androulaki | H04L 9/3242 |
| | | | | 713/155 |
| 11,810,079 | B2 * | 11/2023 | Haldenby | G06Q 20/405 |
| 2016/0260169 | A1 * | 9/2016 | Arnold | G06Q 20/381 |
| 2018/0219836 | A1 * | 8/2018 | Peterson | H04L 67/1097 |
| 2019/0036778 | A1 * | 1/2019 | Bathen | H04L 9/3239 |
| 2019/0325044 | A1 * | 10/2019 | Gray | H04L 9/3239 |
| 2021/0132869 | A1 * | 5/2021 | Tian | G06F 3/0649 |
| 2021/0349770 | A1 * | 11/2021 | Fang | G06F 21/645 |
| 2022/0300487 | A1 * | 9/2022 | Wright | G06F 16/27 |
| 2023/0092365 | A1 * | 3/2023 | Ricotta | H04L 9/50 |
| | | | | 713/193 |
| 2023/0379177 | A1 * | 11/2023 | Moustafa | H04L 9/50 |

OTHER PUBLICATIONS

Extended European Search Report and Search Opinion received for European Application No. 23786169.5, mailed on Jul. 31, 2024, 9 pages.

Office Action received for Japanese Patent Application No. 2023-573451, mailed on Dec. 23, 2024, 8 pages (4 pages of English Translation and 4 pages of Original Document).

Office Action received for European Patent Application No. 23786169.5, mailed on Jun. 3, 2025, 13 pages.

Wikipedia, "Virtualization", XP093281647, Available online at: <https://en.wikipedia.org/w/index.php?title=Virtualization&oldid=1116535435>, Oct. 17, 2022, pp. 1-8.

* cited by examiner

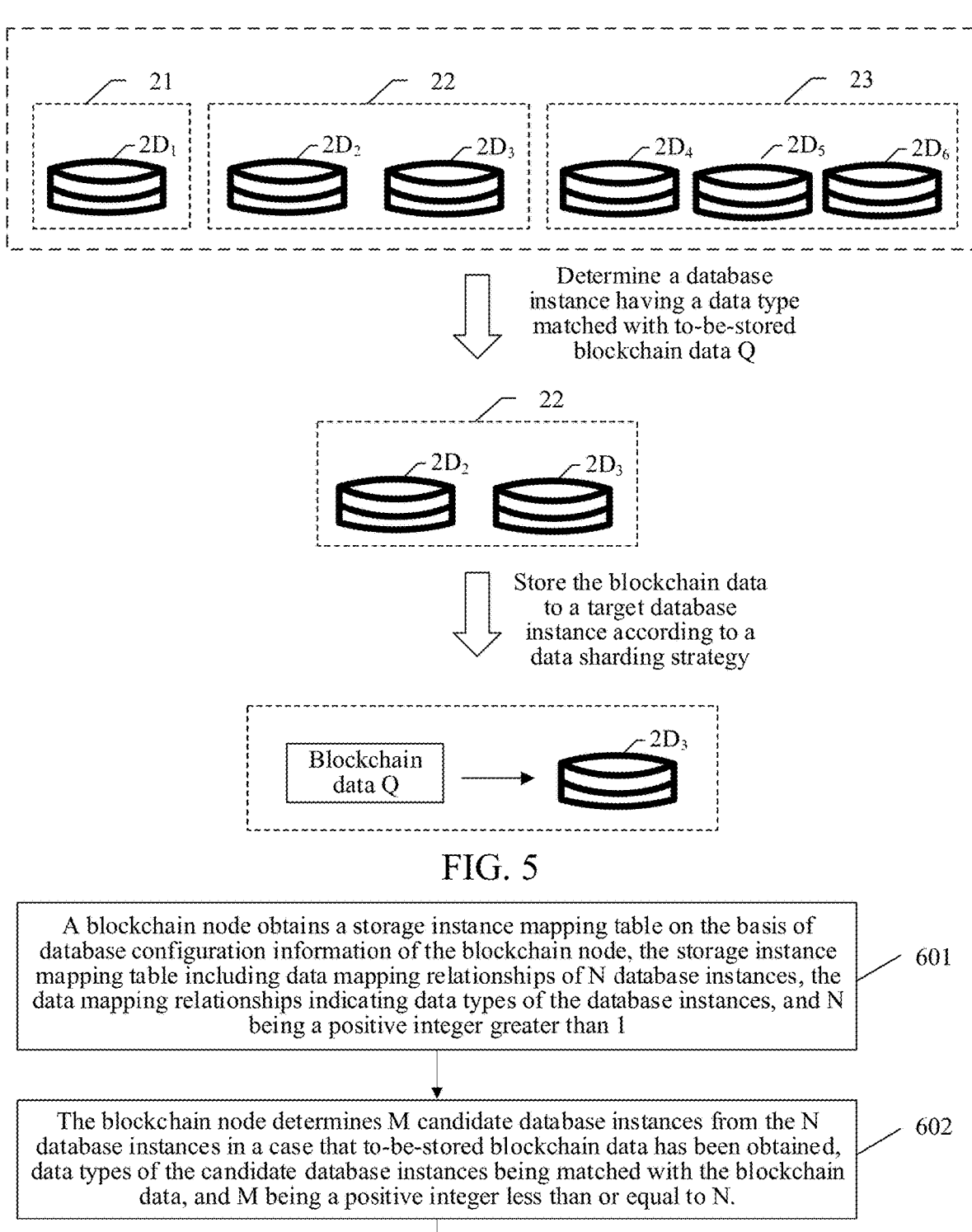

FIG. 5

A blockchain node obtains a storage instance mapping table on the basis of database configuration information of the blockchain node, the storage instance mapping table including data mapping relationships of N database instances, the data mapping relationships indicating data types of the database instances, and N being a positive integer greater than 1      601

The blockchain node determines M candidate database instances from the N database instances in a case that to-be-stored blockchain data has been obtained, data types of the candidate database instances being matched with the blockchain data, and M being a positive integer less than or equal to N.      602

The blockchain node stores the blockchain data to a first database instance among the M candidate database instance on the basis of a data sharding strategy in the database configuration information      603

FIG. 6

DATA PROCESSING METHOD AND APPARATUS BASED ON BLOCKCHAIN, DEVICE, AND MEDIUM

RELATED APPLICATIONS

This application is a continuation of International Application No. PCT/CN2023/112029, filed on Aug. 9, 2023, which claims the benefit of priority to Chinese Patent No. 202211383918.X, filed on Nov. 7, 2022, and entitled "DATA PROCESSING METHOD AND APPARATUS BASED ON BLOCKCHAIN, DEVICE, AND MEDIUM.". The entire contents of the prior applications are hereby incorporated by reference in its entirety.

FIELD OF THE TECHNOLOGY

This disclosure relates to the technical field of blockchains, including to a data processing method and apparatus based on a blockchain, a device, and a medium.

BACKGROUND OF THE DISCLOSURE

In a blockchain system, a database instance may be used for storing blockchain data. Both a blockchain node and the database instance may be deployed on the same device, and there is a one-to-one correspondence relationship between the blockchain node and the database instance. This database instance only uses one hard disk drive. Data of the blockchain nodes is saved on a local hard disk drive of a single machine. When blockchain data has a relatively small data size, this single-machine storage method can still meet a storage need in the short term. However, when the blockchain is applied in some high-frequency trading scenarios, the storage capacity of the blockchain node could be limited by the capacity of a single hard disk drive, and the storage performance could also be limited by a read-write speed of the single hard disk drive, making it difficult to meet the storage need.

SUMMARY

Embodiments of this disclosure provide a data processing method and apparatus based on a blockchain, a device, and a non-transitory computer-readable storage medium.

One aspect of the embodiments of this disclosure provides a data processing method based on a blockchain. In the data processing method, storage instance mapping information is obtained based on database configuration information of a blockchain node. The storage instance mapping information indicates data mapping relationships between a plurality of database instances and data types of the plurality of database instances. At least one candidate database instance is determined from the plurality of database instances when to-be-stored blockchain data is received. The data type of each of the at least one candidate database instances is matched with a data type of the blockchain data. The blockchain data is stored to a first database instance of the at least one candidate database instance based on a data sharding strategy in the database configuration information.

One aspect of the embodiments of this disclosure provides a data processing apparatus based on a blockchain.

The data processing apparatus includes processing circuitry that is configured to obtain storage instance mapping information based on database configuration information of a blockchain node. The storage instance mapping information indicates data mapping relationships between a plurality of database instances and data types of the plurality of database instances. The processing circuitry is configured to determine at least one candidate database instance from the plurality of database instances when to-be-stored blockchain data is received. The data type of each of the at least one candidate database instances is matched with a data type of the blockchain data. The processing circuitry is configured to store the blockchain data to a first database instance of the at least one candidate database instance based on a data sharding strategy in the database configuration information.

One aspect of the embodiments of this disclosure provides a computer device, including: a processor, a memory, and a network interface. The processor is connected to the memory and the network interface, the network interface being used for providing a data communication function, the memory being configured to store a computer program, and the processor being configured to call the computer program to cause the computer device to perform the data processing method based on the blockchain provided by the embodiments of this disclosure.

One aspect of the embodiments of this disclosure provides a non-transitory computer-readable storage medium, the computer-readable storage medium storing instructions which when executed by a processor cause the processor to perform the data processing method based on the blockchain provided by the embodiments of this disclosure.

One aspect of the embodiments of this disclosure provides a computer program product. The computer program product includes a computer program. The computer program is stored in a computer-readable storage medium. A processor of a computer device reads the computer program from the computer-readable storage medium and executes the computer program, causing the computer device to perform the data processing method based on the blockchain provided by the embodiments of this disclosure.

In the embodiments of this disclosure, a blockchain node obtains a storage instance mapping table on the basis of database configuration information of the blockchain node. The storage instance mapping table includes data mapping relationships of N database instances, one data mapping relationship indicates a data type of one database instance. N is a positive integer greater than 1. The blockchain node in the embodiments of this disclosure corresponds to a plurality of database instances, and the plurality of database instances are closely related to the data types. When obtaining to-be-stored blockchain data, the blockchain node determines M candidate database instances of data types matched with the blockchain data from the N database instances included in the storage instance mapping table, and then stores the blockchain data to a first database instance among the M candidate database instances on the basis of a data sharding strategy in the database configuration information, where M is a positive integer less than or equal to N. Therefore, in this storage method provided in the embodiments of this disclosure, a plurality of database instances can be deployed on one blockchain node according to a service need, which significantly increases the storage capacity. Afterwards, when blockchain data is stored to the corresponding database instances according to the data type of the blockchain data in a sharding and classification manner, the blockchain data of different data types can be respectively stored to different database instances, which greatly relieves a storage pressure and achieves a distribution effect. This means that when the storage method of the embodiments of this disclosure is used, the storage capacity and read-write performance of the blockchain node can be multiplied, thereby effectively improving the node storage capability of the blockchain node and meeting a storage need.

BRIEF DESCRIPTION OF THE DRAWINGS

FIG. 5 is a schematic diagram of a scenario of data storage according to an embodiment of this disclosure.

FIG. 6 is a flowchart of a data processing method based on a blockchain according to an embodiment of this disclosure.

DESCRIPTION OF EMBODIMENTS

Technical solutions in the embodiments of this disclosure are described below with reference to the accompanying drawings in the embodiments of this disclosure. The described embodiments are merely some rather than all of the embodiments of this disclosure. Other embodiments are within the scope of this disclosure.

Figure 1:
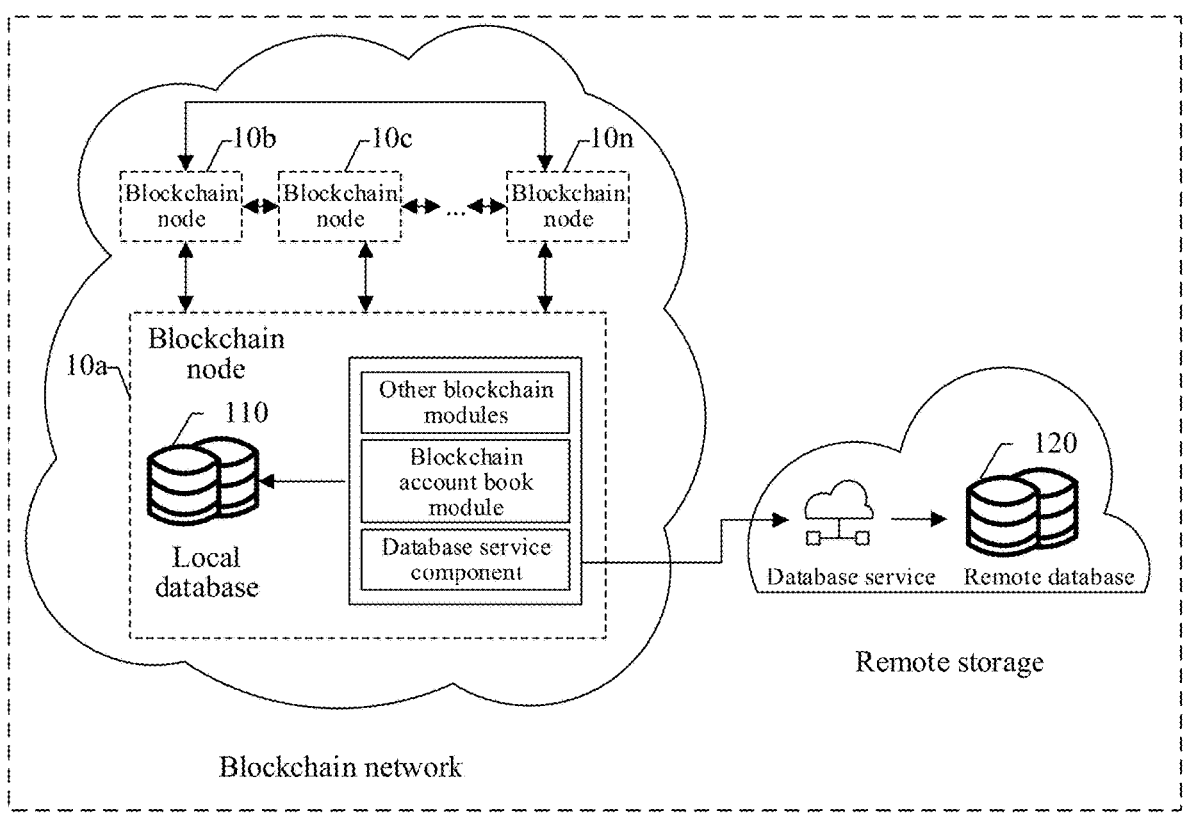
FIG. 1 is a schematic structural diagram of a blockchain node system according to an embodiment of this disclosure.

FIG. 1 is a schematic structural diagram of a blockchain node system according to an embodiment of this disclosure. As shown in FIG. 1, the blockchain node system in the embodiments of this disclosure is a distributed system formed by connecting a plurality of blockchain nodes in the form of network communication. A blockchain network corresponding to the blockchain system is peer to peer networking (P2P network), which is a distributed application architecture that distributes tasks and workloads between users. It is a form of networking or network formed by a P2P computing models at an application layer.

The blockchain system shown in FIG. 1 includes a plurality of blockchain nodes, including node 10*a*, node 10*b*, node 10*c*, . . . , and node 10*n*. The blockchain nodes in the blockchain system are computer devices in any form, which is connected to the blockchain network. For example, the computer device is a terminal device connected to the blockchain network, or a server connected to the blockchain network. A specific form of the blockchain node is not limited.

In an example, the server connected to the blockchain network is an independent physical server, or a server cluster or distributed system including a plurality of physical servers, or a cloud server that provides cloud computing services. The terminal device connected to the blockchain network includes: a smart phone, a tablet computer, a notebook computer, a desktop computer, a smart speaker, a smart watch, a vehicle-mounted terminal, a smart TV, and other intelligent terminals. An application client run on the terminal device in the embodiments of this disclosure is an independent client, or an embedded sub-client integrated into a certain client (such as a social client, an education client, and a multimedia client). It is not limited here.

The blockchain network shown in FIG. 1 includes a plurality of participants, such as a blockchain node (for example, a consensus node or a full node) that needs to save full ledger data, and a blockchain node (for example, a light node) that saves partial ledger data. The light node is used for storing some blockchain databases, that is, storing block header data and transaction data associated with its own nodes, instead of storing complete transaction data. In order to cope with scenarios of massive storage and high performance, the embodiments of this disclosure proposes a classification/sub-database/sharding storage method for this type of blockchain nodes that need to store the full ledger data.

Databases of any blockchain node in the blockchain network include a main database and an archiving database. The main database refers to a database currently being used by the blockchain node. The main database includes a database deployed locally on the blockchain node (for example, a local database 110 of node 10*a* shown in FIG. 1) and a database for remote storage, which has a network connection relationship with the blockchain node (for example, a remote database 120 of node 10*a* shown in FIG. 1). The archiving database refers to an independent database used for batch processing of blockchain data. The batch processing includes batch transfer, batch deletion, or the like.

In an example, each blockchain node includes a blockchain ledger module, a database service component, and other blockchain modules. The blockchain ledger module is configured to provide functions of operations such as storage, query, modification, and deletion of account data, and send recorded data of the operations on the account data to another node in the block chain system. The another node stores, after verifying that the account data is valid, the recorded data to a temporary block in response to admitting that the account data is valid, and may further send an acknowledgement to a node initiating the operation. The database service component is configured to provide a database service for the remote database of the blockchain node, such as storing or accessing blockchain data in the remote database on the basis of the database service. The database service component is also referred to as a Software Development Kit (SDK).

In an example, other blockchain modules include processing modules such as an object management module, a basic service module, a smart contract module, and an operational detection module. It is understood that the object management module is responsible for managing identity information of all blockchain participants, including maintenance of generation of public and private keys (account management), key management, maintenance of correspondence relationships between real identities of objects and blockchain addresses (permission management), and the like. In addition, when authorized, the object management module monitors and audits transaction states of the real identities and provides risk control rule configuration (risk control audit). The basic service module is deployed on all blockchain node devices to verify the validity of service data requests and record valid requests to a storage after consensus completion. For a new service data request, the basic service module first analyzes and authenticates the interface adaptation (interface adaptation), then encrypts service information through a consensus algorithm (consensus management), and transmits the information to a shared ledger (network communication) after encryption for recording and storage. The smart contract module is responsible for registration and issuance of contracts, triggering the contracts, and executing the contracts. A development object defines a contract logic through a certain programming language, posts the contract logic onto the blockchain (contract registration), calls a key or other events to trigger and execute the contracts according to a logic of terms and conditions of the contracts, and also provides functions of upgrading and logging out the contracts. The operational detection module is mainly responsible for deployment in a product release process, configuration modification, contract setting, cloud adaptation, and visual outputting of real-time states during product running, for example: alarm and detecting network conditions, detecting health states of node devices, and the like.

Figure 2:
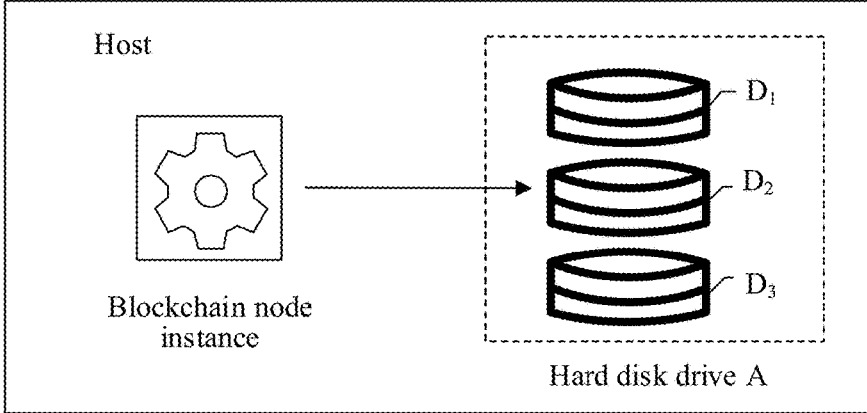
FIG. 2 is a schematic diagram of storage extension performed on a single disk according to an embodiment of this disclosure.

In order to meet a service storage need, the blockchain node in the embodiments of this disclosure is deployed with one or more hard disk drives, and each hard disk drive is deployed with a plurality of database instances. For ease of understanding, FIG. 2 is a schematic diagram of storage extension performed on a single disk according to an embodiment of this disclosure. As shown in FIG. 2, a blockchain node in the embodiments of this disclosure is a blockchain node that is deployed with a single hard disk drive in a host (namely, a main machine part excluding input and output device). The blockchain node is any blockchain node in the blockchain network shown in FIG. 1. For example, the blockchain node is node 10$a$. The blockchain node can be deployed with one a hard disk drive, such as a hard disk drive A shown in FIG. 2.

When a read-write speed of a single database instance cannot meet a service read-write requirements of the blockchain node, and the read-write speed of the database instance has not yet reached an upper limit of the read-write performance of the hard disk drive, in order to fully use read-write resources of the hard disk drive, the embodiments of this disclosure deploys a plurality of database instances in the single hard disk drive on the basis of the storage performance of the hard disk drive A. Three database instances are taken as an example here, including database instance $D_1$, database instance $D_2$, and database instance $D_3$. The storage performance of the hard disk drive A is jointly determined by the storage capacity and read-write performance of the hard disk drive A.

Figure 3:
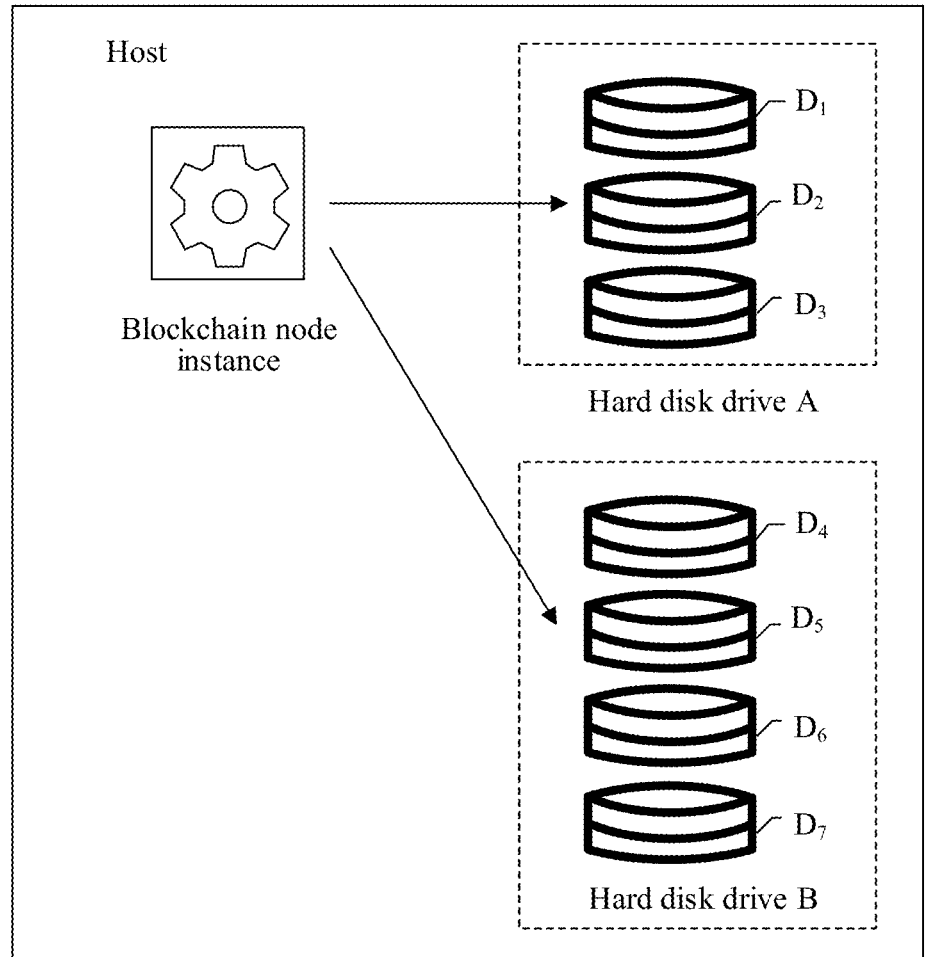
FIG. 3 is a schematic diagram of storage extension performed on multiple disks according to an embodiment of this disclosure.

FIG. 3 is a schematic diagram of storage extension performed on multiple disks according to an embodiment of this disclosure. As shown in FIG. 3, a blockchain node in the embodiments of this disclosure is a blockchain node that is deployed with a plurality of hard disk drives in a host. The blockchain node is any blockchain node in the blockchain network shown in FIG. 1. For example, the blockchain node is node 10$a$. Due to a possible difference in the storage performance of different hard disk drives, an instance quantity of database instances deployed on each hard disk drive will vary according to the storage performance of the hard disk drive itself.

As shown in FIG. 3, two hard disk drives deployed on the blockchain node are taken as an example, including a hard disk drive A and a hard disk drive B, and the storage performance of the hard disk drive B is higher than that of the hard disk drive A. Based on this, when the storage extension scheme shown in FIG. 2 above still cannot meet the service need of the blockchain node, the embodiments of this disclosure can deploy more database instances and distribute the database instances on different hard disk drives, thereby achieving a distribution effect and achieving multiplication in the storage capacity and read-write performance.

The embodiments of this disclosure deploys a plurality of database instances in the hard disk drive A on the basis of the storage performance of the hard disk drive A. Three database instances are taken as an example here, including database instance $D_1$, database instance $D_2$, and database instance $D_3$. The embodiments of this disclosure also deploy a plurality of database instances in the hard disk drive B on the basis of the storage performance of the hard disk drive B. Four database instances are taken as an example here, including database instance $D_4$, database instance $D_5$, database instance $D_6$, and database instance $D_7$.

Figure 4:
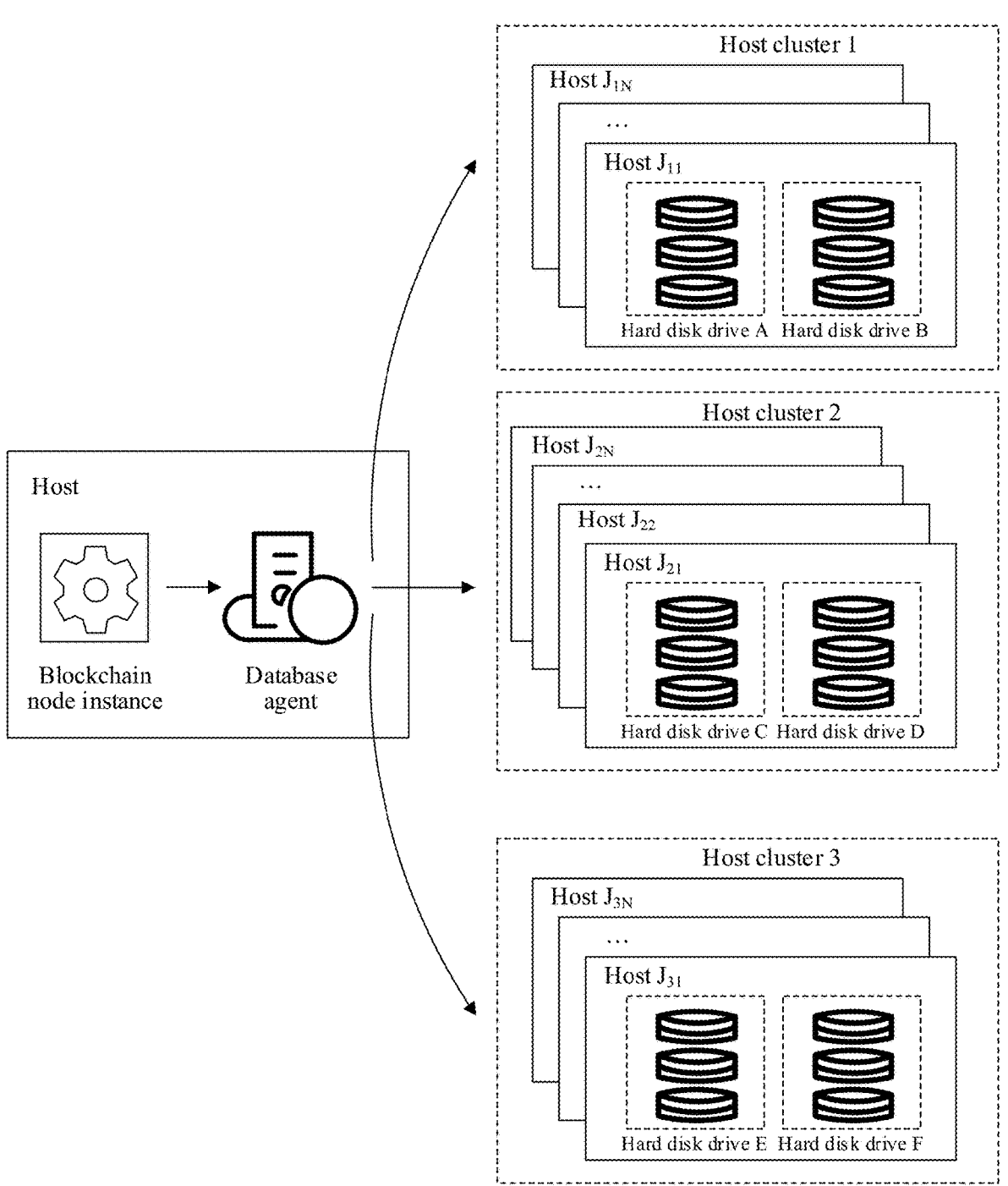
FIG. 4 is a schematic diagram of distributed classification and sub-database storage extension according to an embodiment of this disclosure.

FIG. 4 is a schematic diagram of distributed classified storage extension to different databases according to an embodiment of this disclosure. As shown in FIG. 4, a blockchain node in the embodiments of this disclosure is any blockchain node in the blockchain network shown in FIG. 1. For example, the blockchain node is node 10$a$. When it is difficult for the storage performance of a single machine of the blockchain node to meet a service need, the embodiments of this disclosure perform distributed storage extension, that is, perform storage through a database agent. The database agent and the blockchain node may be deployed on the same computer device, or may be deployed on different computer devices. The deployment of the database agent is not limited here.

In a remote database associated with the blockchain node, the embodiments of this disclosure deploy corresponding host clusters for each data type on the basis of X data types of blockchain data received by the blockchain node. X is a positive integer. In the embodiments of this disclosure, N database instances are deployed in the remote database associated with the blockchain node. The remote database includes host clusters corresponding to the X data types. One data type corresponds to one host cluster, and each host cluster includes a plurality of database host nodes.

As shown in FIG. 4, three data types are taken as an example in the embodiments of this disclosure, including a first data type, a second data type, and a third data type. The first data type refers to a data type corresponding to a small amount of frequently accessed data. For example, the first data type includes a block header data type, a state data type, and the like. The block header data type refers to a data type to which block header data belongs, and the state data type refers to a data type to which state data belongs. The state data includes a risk state of an enterprise object, a state of an electronic bill, an asset state of a service object, and the like. The host cluster corresponding to the first data type is a host cluster 1 shown in FIG. 4. The host cluster 1 includes a plurality of hosts, such as host $J_{11}$, host $J_{12}$, . . . , and host $J_{1N}$. Each host in the host cluster 1 is deployed with a plurality of hard disk drives. For example, host $J_{11}$ is deployed with hard disk drives A and B, and each hard disk drive is deployed with a plurality of database instances.

The second data type refers to a data type of blockchain data that needs to be stored independently. For example, the second data type includes a transaction data type. The transaction data type refers to a data type to which transaction data belongs. The transaction data is equivalent to transaction list details. In some scenarios, the transaction list details do not need to be saved for a long time, so these details need to be stored in an independent database instance, which is conducive to data archiving or regular deletion. The host cluster corresponding to the second data type is a host cluster 2 shown in FIG. 4. The host cluster 2 includes a plurality of hosts, such as host $J_{21}$, host $J_{22}, \ldots,$ and host $J_{2N}$. Each host in the host cluster 2 is deployed with a plurality of hard disk drives. For example, host $J_{21}$ is deployed with hard disk drives C and D, and each hard disk drive is deployed with a plurality of database instances.

The third data type refers to another data type corresponding to blockchain data that needs to be stored independently. For example, the third data type includes a contract data type. The contract data type refers to a data type to which contract data belongs. The contract data refers to real service data, which is independently stored in a plurality of database instances to reduce a data volume in a single database. This can effectively improve the read-write performance of the database, thereby improving the storage performance of the blockchain node. The host cluster corresponding to the third data type is a host cluster 3 shown in FIG. 4. The host cluster 3 includes a plurality of hosts, such as host $J_{31}$, host $J_{32}, \ldots,$ and host $J_{3N}$. Each host in the host cluster 3 is deployed with a plurality of hard disk drives. For example, host $J_{31}$ is deployed with hard disk drives E and F, and each hard disk drive is deployed with a plurality of database instances.

For ease of understanding, FIG. 5 is a schematic diagram of a scenario of data storage according to an embodiment of this disclosure. As shown in FIG. 5, a blockchain node in the embodiments of this disclosure is a blockchain node that needs to save full ledger data in a blockchain network. For example, the blockchain node is any blockchain node in the blockchain network shown in FIG. 1. For example, the blockchain node is node 10*a*.

It is understood that the embodiments of this disclosure divide blockchain data that needs to be stored into X data types, so as to facilitate storage of the blockchain data in different databases according to the data types and improve the storage performance of the node, where X is a positive integer. For ease of elaboration, three data types are taken as an example in the embodiments of this disclosure, including a first data type 21, a second data type 22, and a third data type 23.

When the blockchain node is started, the blockchain node obtains a storage instance mapping table on the basis of database configuration information of the blockchain node. In a case that the blockchain node belongs to a node that is started for the first time, the blockchain node generates the storage instance mapping table on the basis of the database configuration information. In a case that the blockchain node belongs to a node that is not started for the first time, the blockchain node directly loads the generated storage instance mapping table on the basis of the database configuration information.

The storage instance mapping table includes data mapping relationships of N database instances, and one data mapping relationship indicates a data type of one database instance, and N is a positive integer greater than 1. In an example, the N database instances are deployed according to a service need of the blockchain node. That is, all the N database instances are deployed in a local database of the blockchain node (for example, the deployment method shown in FIG. 2 above), or all the N database instances are deployed in a remote database of the blockchain node (for example, the deployment method shown in FIG. 4 above), or the N database instances are deployed in both the local database and the remote database. The deployment of the database instances is not limited here.

Table 1 is a storage instance mapping table according to an embodiment of this disclosure. The storage instance mapping table shown in Table 1 includes the data mapping relationships of the N database instances. N being equal to 6 is taken as an example. The N database instances include database instance $D_1$, database instance $D_2$, database instance $D_3$, database instance $D_4$, database instance $D_5$, and database instance $D_6$. In the embodiments of this disclosure, the database instances of different data types can be deployed on the same hard disk drive or on different hard disk drives. For example, the database instances corresponding to the data type 21, the data type 22, and the data type 23 can be deployed on the same hard disk drive (for example, the hard disk drive A shown in FIG. 2). In an example, the database instances corresponding to the data type 21 and the data type 22 can be deployed on the same hard disk drive (for example, the hard disk drive A shown in FIG. 3), while the database instances corresponding to the data type 23 can be deployed on another hard disk drive (for example, the hard disk drive B shown in FIG. 3). As shown in Table 1:

TABLE 1

| Data type | Database instance |
|---|---|
| Data type 21 | Database instance $D_1$ |
| Data type 22 | Database instance $D_2$ |
| | Database instance $D_3$ |
| Data type 23 | Database instance $D_4$ |
| | Database instance $D_5$ |
| | Database instance $D_6$ |

The data mapping relationship of database instance $D_1$ indicates that the data type of database instance $D_1$ is the data type 21; the data mapping relationship of database instance $D_2$ indicates that the data type of database instance $D_2$ is the data type 22; the data mapping relationship of database instance $D_3$ indicates that the data type of database instance $D_3$ is the data type 22; the data mapping relationship of database instance $D_4$ indicates that the data type of database instance $D_4$ is the data type 23; the data mapping relationship of database instance $D_5$ indicates that the data type of database instance $D_5$ is the data type 23; and the data mapping relationship of database instance $D_6$ indicates that the data type of database instance $D_6$ is the data type 23.

In the embodiments of this disclosure, since blockchain data of different data types have different data volumes and different access frequencies, storage capacities occupied by the blockchain data of different data types may also be different, resulting in different instance quantities of database instances deployed for different data types.

It is understood that the blockchain node needs to determine, in a case that to-be-stored blockchain data has been obtained, M candidate database instances from the N database instances included in the storage instance mapping table shown in Table 1 above, data types of the candidate database instances being matched with the blockchain data, and M being a positive integer less than or equal to N. As shown in FIG. 5, when the blockchain node obtains blockchain data Q that needs to be stored, the blockchain node can determine a data type of the blockchain data Q. If the data type of the blockchain data Q belongs to the data type 22, the blockchain node determines, from the storage instance mapping table shown in Table 1, the database instances (for example, database instance $D_2$ and database instance $D_3$) corresponding to the data type 22 to be database instances matched with the blockchain data Q.

Further, the blockchain node determines, on the basis of a data sharding strategy in the database configuration information, the database instances (namely, the first database instance, for example, database instance $D_3$) to which the blockchain data Q needs to be stored, and stores the blockchain data Q to database instance $D_3$.

According to this, it can be seen that one blockchain node can be deployed with N database instances according to a service need. This means that the storage capacity of the blockchain node can be improved. For blockchain data of any data type, the blockchain data can be stored to a corresponding database instance according to the implementation of storing the blockchain data Q to the first database instance. That is, blockchain data of different data types can be stored separately to different database instances, which greatly alleviates a storage pressure and achieving a distribution effect. This not only addresses the problem of low data read-write performance of the blockchain node, but also addresses the problem of a limited storage space of a single machine. Even through refined contract storage management according to the data types and the data sharding strategy, a possibility of implementation of the blockchain in a storage scenario with a large data volume.

The implementation of classification, sub-database, and sharding storage of the to-be-stored blockchain data by the blockchain node in the blockchain network deployed with the N database instances can be seen in the embodiments in FIG. 6 to FIG. 11 below.

FIG. 6 is a flowchart of a data processing method based on a blockchain according to an embodiment of this disclosure. As shown in FIG. 6, the method is performed by a computer device. The computer device is a blockchain node in a blockchain network. The blockchain node is a blockchain node that needs to save full ledger data in the blockchain network. For example, the blockchain node is any blockchain node in the blockchain network shown in FIG. 1. For example, the blockchain node is node 10*a*. The method may at least include step 601 to step 603 below:

Step 601: The blockchain node obtains a storage instance mapping table on the basis of database configuration information of the blockchain node, the storage instance mapping table including data mapping relationships of N database instances, the data mapping relationships indicating data types of the database instances, and N being a positive integer greater than 1.

The storage instance mapping table includes data mapping relationships of N database instances, one data mapping relationship indicates a data type of one database instance. N is a positive integer greater than 1. In an example, a service object (for example, a user) performs a starting operation on the blockchain node. In response to the starting operation, the blockchain node obtains the storage instance mapping table of the blockchain node on the basis of the database configuration information of the blockchain node. The starting operation refers to a triggering operation used for starting the blockchain node. The triggering operation includes contact operations such as click and long press, or non-contact operations such as voice and gesture. It will not be limited here.

In an example, in a case that the starting operation indicates that blockchain node is started for the first time, the blockchain node needs to initialized, that is, the database configuration information of the blockchain node is loaded, and the N database instances are established on the basis of the database configuration information and a database type of a main database of the blockchain node. After the initialization succeeds, the blockchain node builds a mapping relationship between each database instance and a data type of a hard disk drive to which each database instance belongs, and generates the storage instance mapping table on the basis of the built mapping relationship.

The database configuration information refers to information that is configured by a configuration object (for example, a configuration user of the blockchain node) for the blockchain node on the basis of a service storage need and is associated with databases of the blockchain node. For example, the database configuration information includes a database storage path, an instance quantity configured for hard disk drives of the blockchain node, a data sharding strategy, and the like. The data storage path includes a plurality of storage paths configured by the configuration object for blockchain data of different data types. The instance quantity is determined on the basis of the storage performance of the hard disk drives deployed on the blockchain node. The data sharding strategy refers to a computing method used by the blockchain node to store the blockchain data, for example, a consistent hashing algorithm.

For example, when the configuration object determines that the data type of the blockchain data includes X data types (X is a positive integer), in order to improve the node performance of the blockchain node, the configuration object configures different database instances for each data type to store various types of blockchain data into different database instances. Of course, the same type of data can also be stored into a plurality of database instances, and the hard disk drives corresponding to the database instances can be deployed in a local database of the blockchain node or in a remote database of the blockchain node. It will not be limited here.

In an example, both the local database and the remote database of the blockchain node can be deployed with one or more hard disk drives. The database storage path in the database configuration information in the embodiments of this disclosure indicates a hard disk drive set associated with the X data types, including storage paths corresponding to the various data types.

For example, the X data types include at least one of a first data type, a second data type, or a third data type; The first data type includes at least one of a block header data type or a state data type. The second data type includes a transaction data type. The third data type includes a contract data type. Due to a relatively high read-write frequency and relatively small data volume of blockchain data of the first data type, when configuring database instances for the first data type, the configuration object selects a machine (that is, hard disk drive) with a relatively small storage capacity and low storage performance, so as to significantly save the costs while meeting a service need. The storage performance of the hard disk drive of the first data type is lower than that of a hard disk drive of the second data type hard disk drive and that of a hard disk drive of the third data type.

Further, referring to Table 2, Table 2 is a schematic pseudo-code table associated with the database configuration information according to an embodiment of this disclosure. For ease of elaboration, four hard disk drives deployed on the blockchain node in the embodiments of this disclosure and associated with the X data types are taken as an example, including hard disk drive A (such as data1), hard disk drive B (such as data2), and hard disk drive D (such as data4) deployed in the local database, as well as hard disk C (such as data3) deployed in the remote database.

The computer device corresponding to the remote database can be represented by a data format of endpoint: port. As shown in Table 2:

TABLE 2

```
"leveldb": [
    {
        "dataType": "blockHeader",
        "rootPath": "/data1/blockHeader"
    },
    {
        "dataType": "transaction",
        "rootPath": "/data1/transaction",
        "instance": 3,
        "shardingStrategy": "hash"
    },
    {
        "dataType": "transaction",
        "rootPath": "/data2/transaction",
        "instance": 3,
        "shardingStrategy": "hash"
    },
    {
        "dataType": "transaction",
        "rootPath": "xx.xx.xx.xx:xx@/data3/transaction",
        "instance": 3,
        "shardingStrategy": "hash"
    },
    {
        "dataType": "contract",
        "rootPath": "/data4/contract",
        "instance": 3,
        "shardingStrategy": "hash"
```

As shown in Table 2, the storage performance of the hard disk drive A in the local database is lower than that of other hard disk drives. Therefore, when the first data type is the block header data type, the storage path corresponding to the first data type in the database configuration information is directory "/data1/blockHeader". When the second data type is the transaction data type, the storage path corresponding to the second data type in the database configuration information includes directory "/data1/transaction/data2/transaction" in the local database and directory "/data3/transaction" in the remote database. This means that the configuration object configures three storage positions for the transaction data type. When the third data type is the contract data type, the storage path corresponding to the third data type in the database configuration information includes directory "/data4/contract" in the local database. When a plurality of database instances are deployed in the same directory, root directories of the database instances each include a target prefix and a serial number of an instance. For example, if a plurality of database instances are deployed on the hard disk drive A, the storage path corresponding to the transaction data type is "/data1/transaction/1, /data1/transaction/2, /data1/transaction/3".

Figure 7:
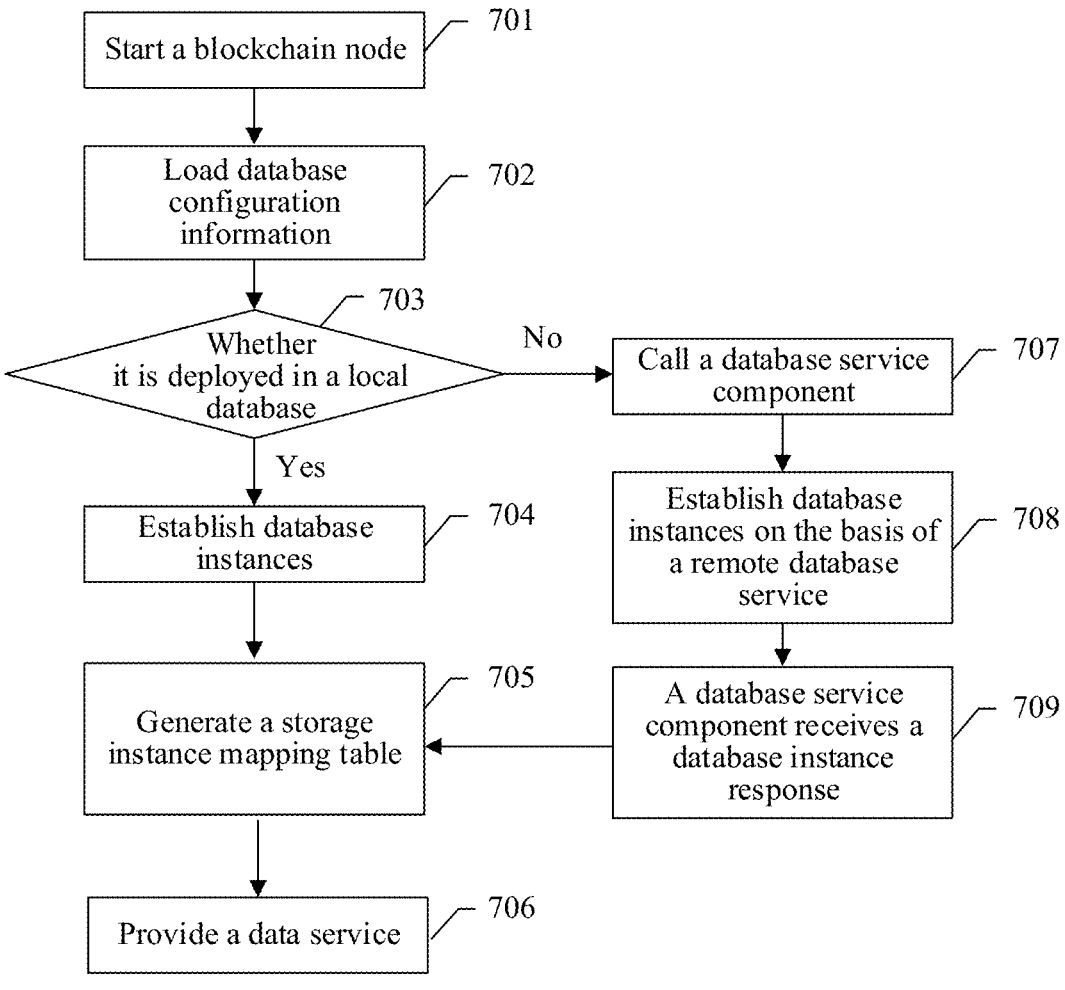
FIG. 7 is a flowchart of obtaining a storage instance mapping table according to an embodiment of this disclosure.

For ease of understanding, FIG. 7 is a flowchart of obtaining a storage instance mapping table according to an embodiment of this disclosure. As shown in FIG. 7, a blockchain node in the embodiments of this disclosure is any blockchain node in the blockchain network shown in FIG. 1. For example, the blockchain node is node 10a.

In a case that a starting operation performed on the blockchain node indicates that the blockchain node is started for the first time, the blockchain node executes step 702 after step 701 of starting the blockchain node is executed, so as to load database configuration information. Further, the blockchain node can obtain a database type of a main database of the blockchain node, so as to determine whether to automatically execute step 703 to step 704 according to a smart contract on a blockchain to establish database instances or manually establish database instances according to a configuration object of the blockchain node.

The database type of the main database includes a first type (for example, a type that database instances can be automatically established according to the smart contract) and a second type (for example, a type that database instances need to be manually established).

In a case that the database type of the blockchain node belongs to the first type, the blockchain node obtains the smart contract from the blockchain to which the blockchain node belongs, and the smart contract is used for establishing database instances. The smart contract is a computerized protocol, which can be used for executing terms and conditions of a contract and is implemented by using codes that are deployed in a shared account book and that are executed when a condition is satisfied. The codes are used for completing, according to an actual service need, an automated transaction. Further, the blockchain node respectively establishes a database instance for each hard disk drive in the hard disk drive set on the basis of the smart contract to obtain the N database instances. In an example, the blockchain node determines, for each hard disk drive in the hard disk drive set, an instance quantity of each hard disk drive on the basis of the database configuration information.

Further, the blockchain node executes step 703 to determine whether a to-be-established hard disk drive is deployed in the local database. For example, in a case that the hard disk drive is deployed in the local database in the main database, the blockchain node executes step 704 to establish, on the basis of the smart contract, the database instance corresponding to the instance quantity for the hard disk drive. In an example, the blockchain node calls a database service component in a case that the hard disk drive is deployed in a remote database in the main database, and establishes, on the basis of the smart contract, the database instance corresponding to the instance quantity for the hard disk drive, the database service component being configured to provide a remote database service. That is, the blockchain node jumps to execute step 707 to step 709, calls the database service component, and establishes, on the basis of the remote database service provided by the database service component, the database instance corresponding to the instance quantity. When the establishment is completed, the database service component receives a response from the database instance.

In an example, in a case that the database type of the blockchain node belongs to the second type, the blockchain node displays prompt information associated with the database configuration information to enable the configuration object to perform a triggering operation on the basis of the prompt information. The prompt information can be information corresponding to types such as images, videos, audios, texts, and the like. The information type of the prompt information will not be limited here. The blockchain node respectively establishes a database instance for each hard disk drive in the hard disk drive set in response to a triggering operation performed on the prompt information to obtain the N database instances.

When the establishment of both the local database and the remote database is completed, the blockchain node executes step 705 to build a mapping relationship between each database instance and a data type of a hard disk drive to which each database instance belongs, and generate the storage instance mapping table on the basis of the built mapping relationship, so as to execute step 706 subsequently and provide data services (for example, a data access service) for the blockchain node.

Figure 8:
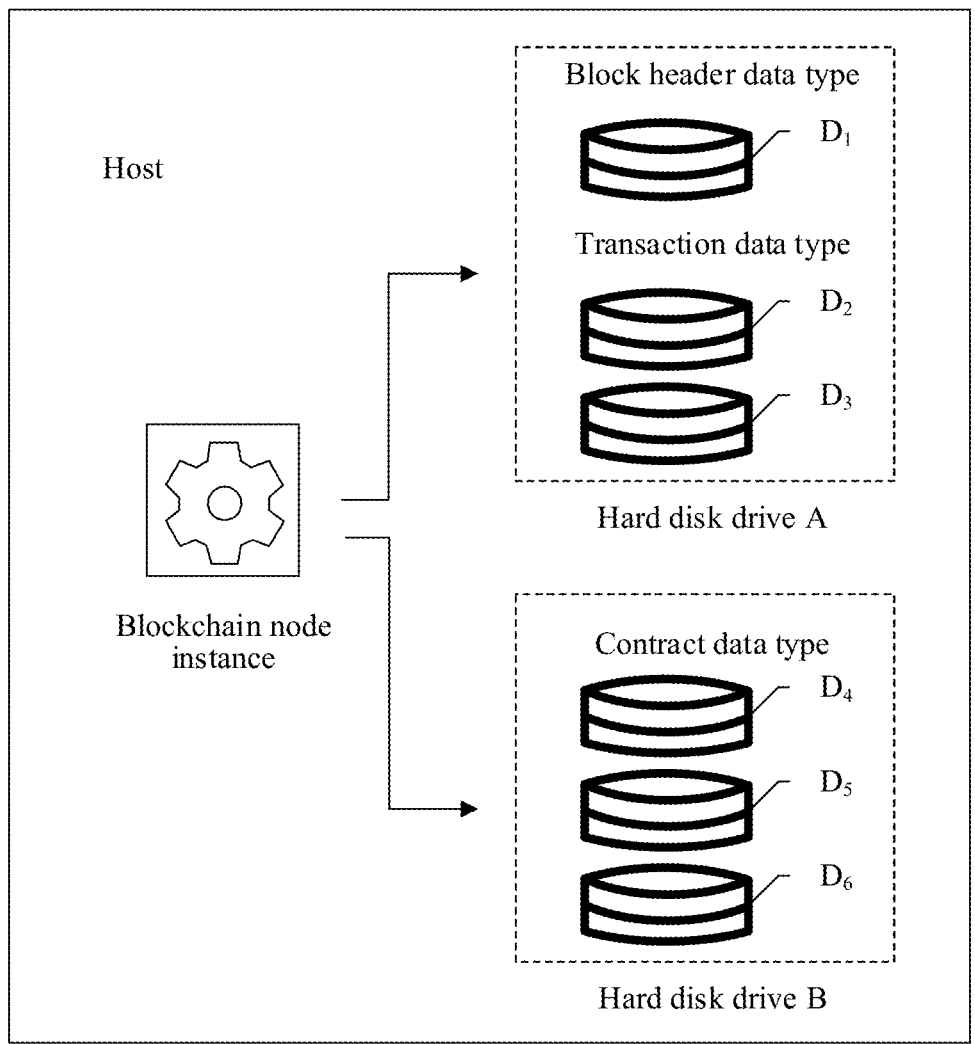
FIG. 8 is a schematic structural diagram of sub-database and classification storage of data according to an embodiment of this disclosure.

For ease of understanding, FIG. 8 is a schematic structural diagram of sub-database and classification storage of data according to an embodiment of this disclosure. As shown in FIG. 8, a blockchain node in the embodiments of this disclosure is a blockchain node that is deployed with a plurality of hard disk drives in a host. The blockchain node is any blockchain node in the blockchain network shown in FIG. 1. For example, the blockchain node is node 10a.

The blockchain node shown in FIG. 8 loads database configuration information after responding to a starting operation. Among them, storage path information in the database configuration information indicates a hard disk drive set associated with three data types (for example, a block header data type, a transaction data type, and a contract data type). The hard disk drive set includes a hard disk drive A and a hard disk drive B deployed locally according to a service need.

The blockchain node can establish database instances for the main database according to a database type (for example, a first type) of a main database and the database configuration information. A storage path of the database configuration information indicates instance quantities of different data types in each hard disk drive. For example, an instance quantity (namely, a first instance quantity) of the block header data type in the hard disk drive A is 1; an instance quantity (namely, a second instance quantity) of the transaction data type in the hard disk drive A is 2; and an instance quantity (namely, a third instance quantity) of the contract data type in the hard disk drive B is 3.

The hard disk drive A is taken as an example. The blockchain node determines, on the basis of the database configuration information, that the instance quantity of the hard disk drive A is a sum (namely, 3) of the first instance quantity and the second instance quantity. In this case, the blockchain node establishes three database instances for the hard disk drive A on the basis of a smart contract, including database instance $D_1$, database instance $D_2$, and database instance $D_3$.

Similarly, the hard disk drive B is taken as an example. The blockchain node determines, on the basis of the database configuration information, that the instance quantity of the hard disk drive B is the third instance quantity (namely, 3). In this case, the blockchain node establishes three database instances for the hard disk drive B on the basis of a smart contract, including database instance $D_4$, database instance $D_5$, and database instance $D_6$.

Further, the blockchain node builds a mapping relationship between each of the six database instances and a data type of a hard disk drive to which the database instance belongs, and generates the storage instance mapping table shown in Table 1 above on the basis of the built mapping relationship. For example, a storage method for the storage instance mapping table is Key-Value storage, KV storage for short. That is, the blockchain node determines Key as a data type and Value as a database instance.

The storage instance mapping table in the embodiments of this disclosure can be an independent mapping table including the X data types as shown in Table 1 above, or a mapping table including X storage instance mapping subtables, which will not be limited here. For example, when the storage extension method of the blockchain node is shown in FIG. 4 above, the blockchain node establishes a storage mapping subtable for each data type, so as to quickly determine, through a database agent, a host cluster that needs to be accessed from the X host clusters, thereby improving the access efficiency.

Step 602: The blockchain node determines M candidate database instances from the N database instances in a case that to-be-stored blockchain data has been obtained, data types of the candidate database instances being matched with the blockchain data, and M being a positive integer less than or equal to N.

In an example, in a case that the to-be-obtained blockchain data has been obtained, the blockchain node determines data information of the blockchain data and then determines a data type of the blockchain data on the basis of the data information of the blockchain data. Further, the blockchain node searches the storage instance mapping table for a data type matched with the data type of the blockchain data, and determines database instances corresponding to the found data type to be the candidate database instances, thereby obtaining the M candidate database instances.

In an example, the database configuration information includes a data volume threshold and an access frequency threshold which are configured according to the service need. In a case that the data information indicates that a data volume of the blockchain data does not reach the data volume threshold and a data access frequency of the blockchain data reaches the access frequency threshold, it indicates that the blockchain data belongs to a small amount of frequently accessed data. In this case, the blockchain node determines the first data type to be the data type of the blockchain data. In an example, in a case that the data information indicates that the blockchain data belongs to transaction data, the blockchain node determines the second data type to be the data type of the blockchain data. For example, the transaction data includes asset transfer transaction data, electronic bill transfer transactions, or the like. In an example, the blockchain node determines the third data type to be the data type of the blockchain data in a case that the data information indicates that the blockchain data belongs to contract data. Of course, the X data types in the embodiments of this disclosure can also include other data types, which will not be exemplified one by one here.

As shown in FIG. 5, when the blockchain node obtains blockchain data Q that needs to be stored, the blockchain node determines a data type of the blockchain data Q. If the data type of the blockchain data Q belongs to the data type 22, the blockchain node determines, from the storage instance mapping table shown in Table 1, the database instances (for example, database instance $D_2$ and database instance $D_3$) corresponding to the data type 22 to be two candidate database instances matched with the blockchain data Q.

Step 603: The blockchain node stores the blockchain data to a first database instance among the M candidate database instance on the basis of a data sharding strategy in the database configuration information.

In an example, the blockchain node generates, from a hash value space according to a storage direction on the basis of the data sharding strategy in the database configuration information, a hash ring associated with the data type of the blockchain data. Further, the blockchain node performs hash computation on first key information (such as an address, a directory, and other inputted information) of each candidate database instance among the M candidate database instances to obtain first position information of each candidate database instance on the hash ring. Similarly, the blockchain node can also perform hash computation on second key information (such as a data hash value) of the blockchain data to obtain second position information of the blockchain data on the hash ring. Further, the blockchain node searches the hash ring along the storage direction for first position information having a closest position relationship with the second position information, and determines a database instance corresponding to the found first position information to be the first database instance, thereby storing the blockchain data to the first database instance.

As the embodiments of this disclosure involve X data types, when the blockchain data of the X data types are stored in separate databases, this means that the embodiments of this disclosure involve X groups of database instances, and each group of database instances correspond to one hash ring, that is, the embodiments of this disclosure involve X hash rings. When the data types include the block header data type, the transaction data type, and the contract data type, this embodiment of this disclosure will involve three hash rings, and the three hash rings respectively correspond to the database mapping relationships of the three data types.

Figure 9:
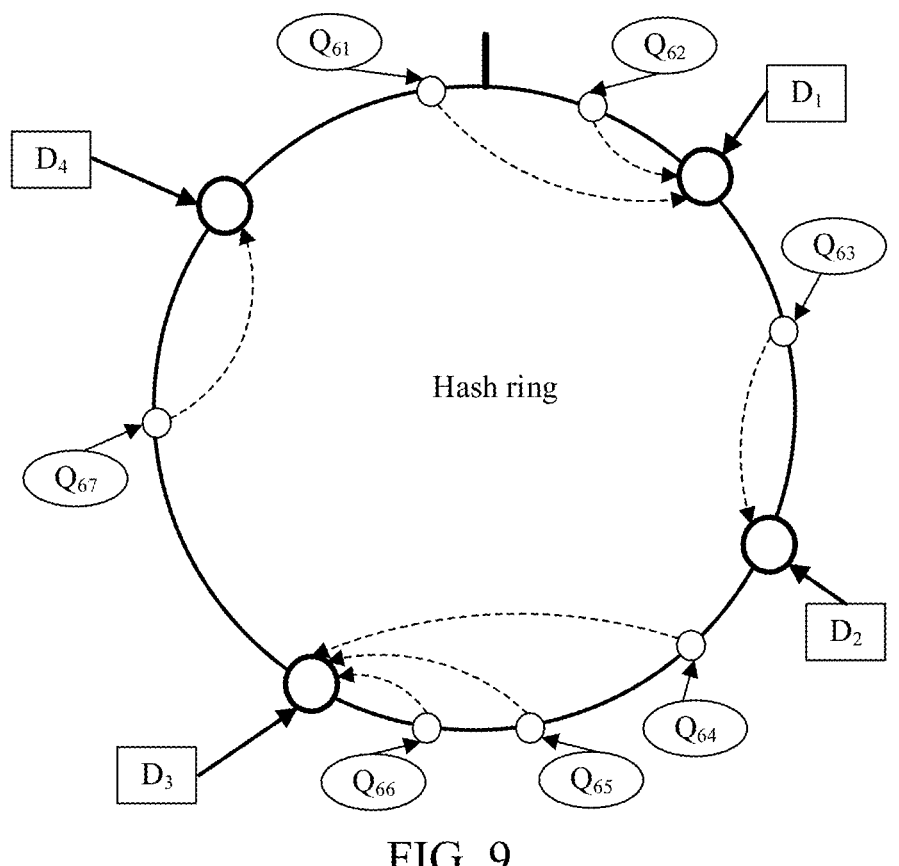
FIG. 9 is a schematic diagram of a scenario of storing blockchain data according to an embodiment of this disclosure.

For ease of understanding, FIG. 9 is a schematic diagram of a scenario of storing blockchain data according to an embodiment of this disclosure. As shown in FIG. 9, the hash ring in the embodiments of this disclosure is a hash ring corresponding to the data type of the to-be-stored blockchain data. The hash ring is generated from a hash value space according to a storage direction on the basis of a data sharding strategy (for example, a consistent hashing algorithm) in database configuration information. The hash value space refers to a numerical space from 0 to $(2^{\wedge}32)-1$.

In an example, four candidate database instances determined by the blockchain node from the storage instance mapping table are taken as an example, including database instance $D_1$, database instance $D_2$, database instance $D_3$, and database instance $D_4$ shown in FIG. 9. The blockchain node performs hash computation on first key information of each of the four database instances to obtain first position information of each database instance on the hash ring;

The to-be-stored blockchain data obtained by the blockchain node includes blockchain data $Q_{61}$, blockchain data $Q_{62}$, blockchain data $Q_{63}$, blockchain data $Q_{64}$, blockchain data $Q_{65}$, and blockchain data $Q_{66}$ shown in FIG. 9. For example, for database instance $D_1$, the blockchain node obtains directory information, device information (for example, a device identifier), and the like of database instance $D_1$ to be first key information of database instance $D_1$. Further, the blockchain node performs the hash computation on the first key information of database instance $D_1$ according to the consistent hashing algorithm to obtain a hash value of database instance $D_1$. The hash value of database instance $D_1$ is mapped onto the hash ring to obtain first position information of database instance $D_1$ on the hash ring.

Further, the blockchain node performs hash computation on second key information of the blockchain data to obtain second position information of the blockchain data on the hash ring. For example, for blockchain data $Q_{61}$, the blockchain node needs to determine second key information of blockchain data $Q_{61}$ on the basis of a data type of blockchain data $Q_{61}$. Further, the blockchain node performs the hash computation on the second key information of blockchain data $Q_{61}$ according to the consistent hashing algorithm to obtain a hash value of blockchain data $Q_{61}$. The hash value of blockchain data $Q_{61}$ is mapped onto the hash ring to obtain second position information of blockchain data $Q_{61}$ on the hash ring.

In a case that the data type of blockchain data $Q_{61}$ is a block header data type, the blockchain node takes a block header hash value of blockchain data $Q_{61}$ as the second key information of blockchain data $Q_{61}$. For example, in a case that the data type of blockchain data $Q_{61}$ is a transaction data type, the blockchain node takes a transaction hash value of blockchain data $Q_{61}$ as the second key information of blockchain data $Q_{61}$. In an example, in a case that the data type of blockchain data $Q_{61}$ is a contract data type, the blockchain node takes a contract hash value of blockchain data $Q_{61}$ as the second key information of blockchain data $Q_{61}$.

Further, the blockchain node searches, on the basis of the second position information of the blockchain data, the hash ring along the storage direction for first position information having a closest position relationship with the second position information, and determines a database instance corresponding to the found first position information to be the first database instance, thereby storing the blockchain data to the first database instance.

For example, for blockchain data $Q_{61}$, the blockchain node searches, on the basis of the second position information of blockchain data $Q_{61}$, the hash ring along a clockwise storage direction for first position information having a closest position relationship with the second position information, and determines a database instance (for example, database instance $D_1$ shown in FIG. 9) corresponding to the found first position information to be the first database instance, thereby storing the blockchain data to the first database instance.

By parity of reasoning, with reference to the storage method of blockchain data $Q_{61}$, the blockchain node stores blockchain data $Q_{62}$ to database instance $D_1$, stores blockchain data $Q_{63}$ to database instance $D_2$, stores blockchain data $Q_{64}$, blockchain data $Q_{65}$, and blockchain data $Q_{66}$ to database instance $D_3$, and stores blockchain data $Q_{67}$ to database instance $D_4$.

Therefore, in this storage method provided in the embodiments of this disclosure, a plurality of database instances can be deployed on one blockchain node according to a service need, which significantly increases the storage capacity. Afterwards, when blockchain data is stored to the corresponding database instances according to the data type of the blockchain data in a sharding and classification manner, the blockchain data of different data types can be respectively stored to different database instances, which greatly relieves a storage pressure and achieves a distribution effect. This means that when the storage method of the embodiments of this disclosure is used, the storage capacity and read-write performance of the blockchain node can be multiplied, thereby effectively improving the node storage capability of the blockchain node and meeting a storage need.

Figure 10:
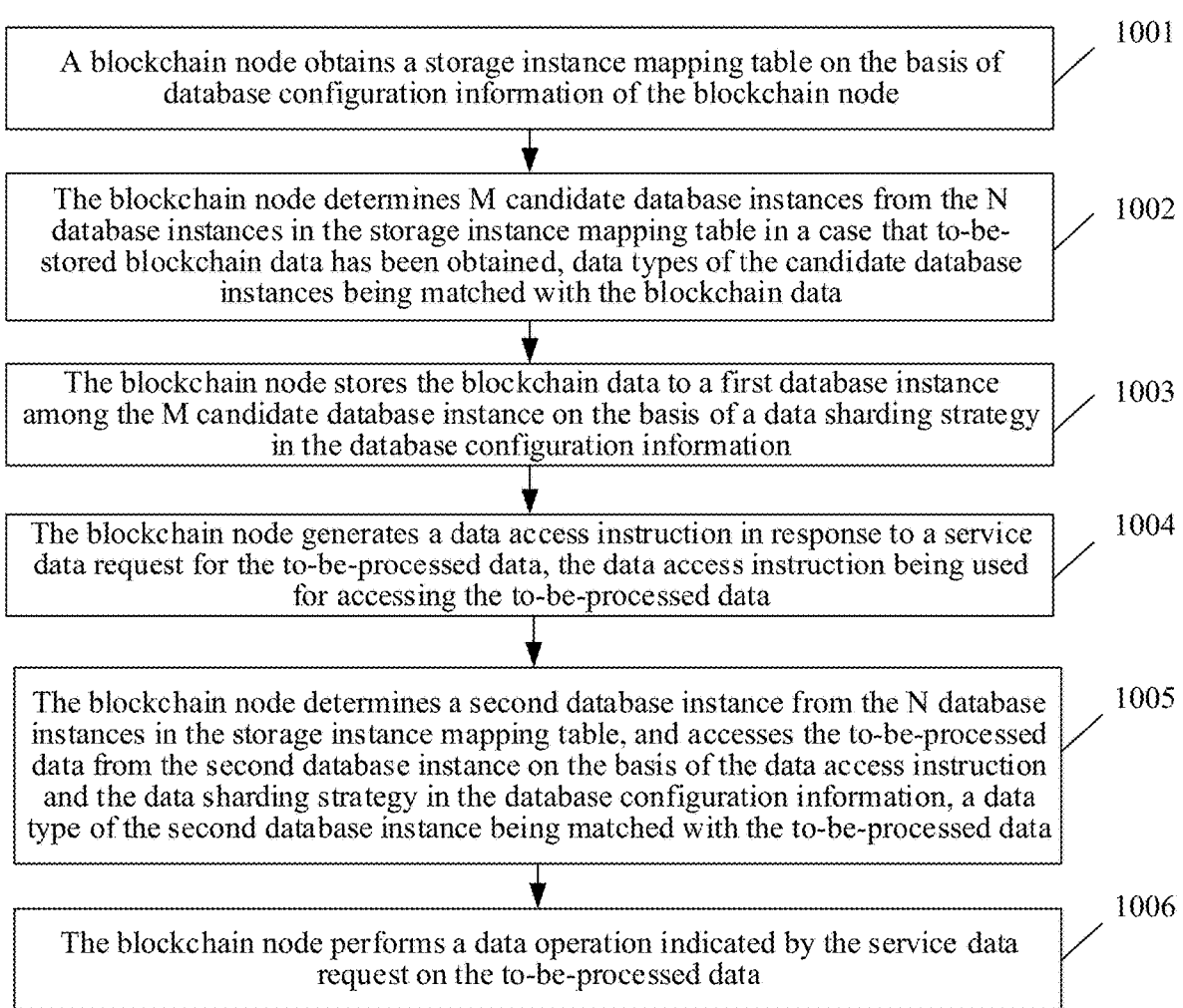
FIG. 10 is a flowchart of a data processing method based on a blockchain according to an embodiment of this disclosure.

FIG. 10 is a flowchart of a data processing method based on a blockchain according to an embodiment of this disclosure. As shown in FIG. 10, the method is performed by a computer device. The computer device is a blockchain node in a blockchain network. The blockchain node is a blockchain node that needs to save full ledger data in the blockchain network. For example, the blockchain node is any blockchain node in the blockchain network shown in FIG. 1. For example, the blockchain node is node 10a. The method may at least include step 1001 to step 1006 below:

Step 1001: The blockchain node obtains a storage instance mapping table on the basis of database configuration information of the blockchain node.

The storage instance mapping table includes data mapping relationships of N database instances, one data mapping relationship indicates a data type of one database instance. N is a positive integer greater than 1. In an example, a service object (for example, a user) performs a starting operation on the blockchain node. In response to the starting operation, the blockchain node obtains the storage instance mapping table of the blockchain node on the basis of the database configuration information of the blockchain node. The starting operation refers to a triggering operation used for starting the blockchain node. The triggering operation includes contact operations such as click and long press, or non-contact operations such as voice and gesture. It will not be limited here.

Step 1002: The blockchain node determines M candidate database instances from the N database instances in the storage instance mapping table in a case that to-be-stored blockchain data has been obtained, data types of the candidate database instances being matched with the blockchain data.

M being a positive integer less than or equal to N. In an example, in a case that the to-be-obtained blockchain data has been obtained, the blockchain node determines data information of the blockchain data and then determines a data type of the blockchain data on the basis of the data information of the blockchain data. Further, the blockchain node searches the storage instance mapping table for a data type matched with the data type of the blockchain data, and determines database instances corresponding to the found data type to be the candidate database instances, thereby obtaining the M candidate database instances.

Step 1003: The blockchain node stores the blockchain data to a first database instance among the M candidate database instance on the basis of a data sharding strategy in the database configuration information.

In an example, the blockchain node generates, from a hash value space according to a storage direction on the basis of the data sharding strategy in the database configuration information, a hash ring associated with the data type of the blockchain data. Further, the blockchain node performs hash computation on first key information (such as an address, a directory, and other inputted information) of each candidate database instance among the M candidate database instances to obtain first position information of each database instance on the hash ring. Similarly, the blockchain node performs hash computation on second key information (such as a data hash value) of the blockchain data to obtain second position information of the blockchain data on the hash ring. Further, the blockchain node searches the hash ring along the storage direction for first position information having a closest position relationship with the second position information, determines a database instance corresponding to the found first position information to be the first database instance, and stores the blockchain data to the first database instance.

For exemplary implementations of step 1001 to step 1003, reference may be made to the descriptions of step 601 to step 603 in the embodiment of FIG. 6 above. Details will be omitted here.

In an example, the blockchain data includes to-be-processed data.

Step 1004: The blockchain node generates a data access instruction in response to a service data request for the to-be-processed data, the data access instruction being used for accessing the to-be-processed data.

The service data request is generated by the blockchain node on the basis of a data type of the to-be-processed data, or may be transmitted by another computer device (for example, another blockchain node in the blockchain network or a terminal device corresponding to a service object) that has a network connection relationship with the blockchain node. A source of the service data request will not be limited here.

If the service data request is transmitted by another computer device that has a network connection relationship with the blockchain node, in order to effectively improve the security of data transmission, the computer device obtains a node public key of the blockchain node and encrypts the data information such as the data type of the to-be-processed data to obtain encrypted data information, so that the service data request transmitted to the blockchain node can be generated on the basis of the encrypted data information. When the blockchain node receives the service data request, the blockchain node first verifies the validity of the computer device (for example, whether the computer device belongs to an invalid list of computer devices). When it is verified that the computer device is valid, the blockchain node decrypts the encrypted data information on the basis of the node private key of the blockchain node to obtain the data type and other data information of the to-be-processed data, and generates, on the basis of the data information, the data access instruction used for accessing the to-be-processed data.

Step 1005: The blockchain node determines a second database instance from the N database instances in the storage instance mapping table, and accesses the to-be-processed data from the second database instance on the basis of the data access instruction and the data sharding strategy in the database configuration information, a data type of the second database instance being matched with the to-be-processed data.

In an example, with reference to the implementation corresponding to step 602 above, the blockchain node determines the second database instance from the N database instances included in the storage instance mapping table, and then determines, from the second database instance according to the storage method shown in FIG. 9 above and on the basis of the data sharding strategy in the database configuration information, a service database instance to which the to-be-processed data belongs, so as to access the to-be-processed data from the service database instance.

In an example, the N database instances are all deployed in a remote database associated with the blockchain node. The remote database includes a host cluster corresponding to X data types. X is a positive integer. One data type corresponds to one host cluster. When the blockchain node accesses the to-be-processed data, the blockchain node determines a target host cluster from the X host clusters, and a data type of the target host cluster is matched with the to-be-processed data. In an example, the service data request carries the data type of the to-be-processed data. The data type of the target host cluster is matched with the to-be-processed data, which means that the data type of the target host cluster is matched with the to-be-processed data. The blockchain node determines a database instance deployed in the target host cluster to be the second database instance. Further, the blockchain node determines, from the second database instance on the basis of the data sharding strategy in the database configuration information, the service database instance to which the to-be-processed data belongs, forwards the data access instruction to a database agent having a network connection relationship with the blockchain node, so that the database agent transmits the data access instruction to a database host node deployed by the service database instance. In this case, the blockchain node receives the to-be-processed data returned by the database host node through the database agent.

For example, if the storage extension method of the blockchain node is as shown in FIG. 4 above, the blockchain node can determine host cluster 1 from the three host clusters when accessing the to-be-processed data. A data type of host cluster 1 is matched with the data type of the to-be-processed data, and then a database instance deployed in host cluster 1 is determined to be the second database instance. Further, the blockchain node determines, from the second database instance on the basis of the data sharding strategy in the database configuration information and according to the method shown in FIG. 9 above, the service database instance (for example, the hard disk drive A shown in FIG. 4) to which the to-be-processed data belongs.

In this way, the blockchain node calls a database service component. The database service component can be deployed on the same device as the blockchain node or deployed separately on another device different from the blockchain node. It will not be limited here. If the database service component is deployed separately on another device different from the blockchain node, this device is referred to as a database agent having a network connection relationship with the blockchain node in the embodiments of this disclosure. The blockchain node forwards the data access instruction to the database agent shown in FIG. 4 to cause the database agent to transmit data access instruction to the database host node (for example, the database host node where host $J_{11}$ is located) deployed by the service database instance. In this case, the blockchain node can receive the to-be-processed data returned by the database host node through the database agent.

Figure 11:
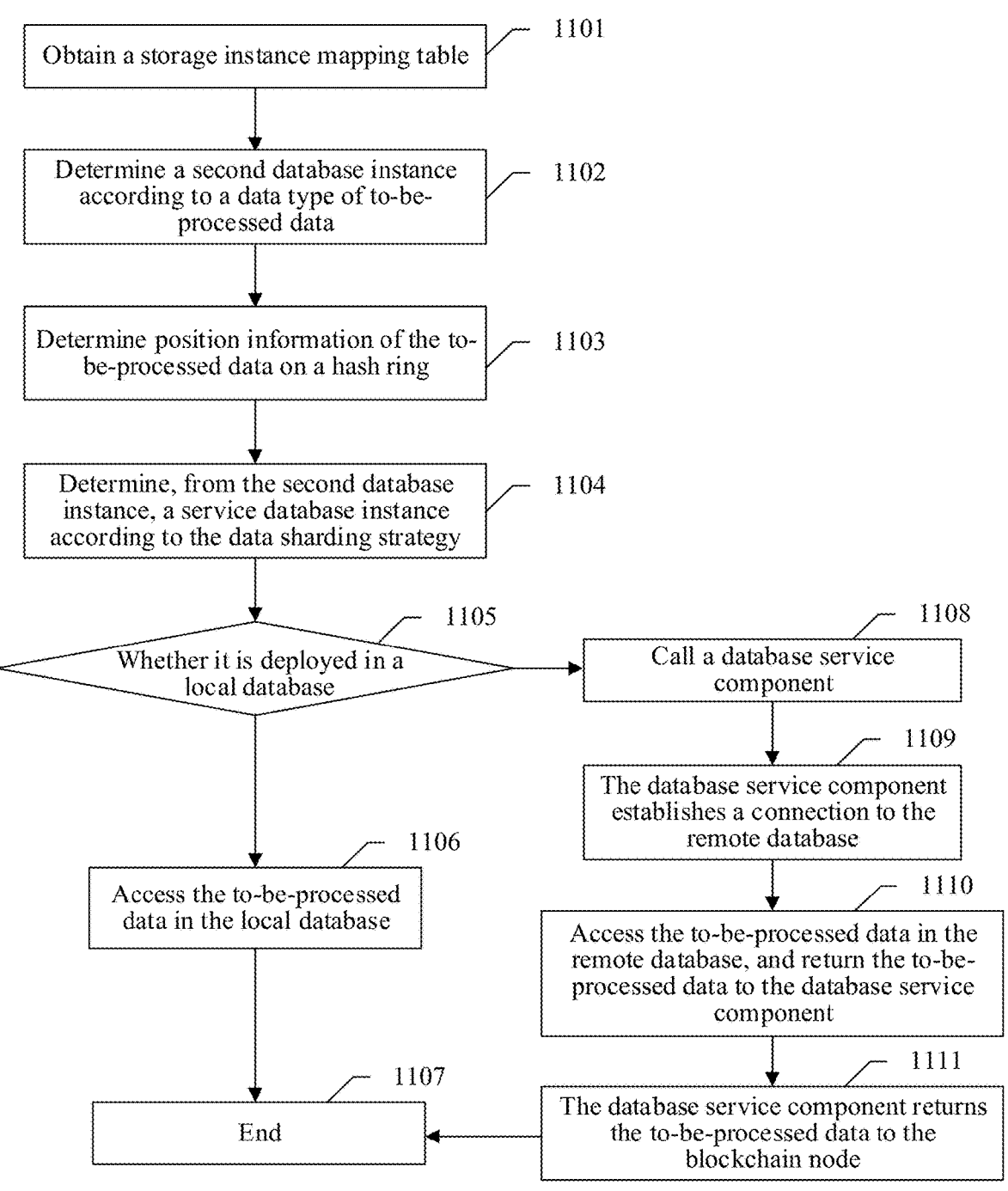
FIG. 11 is a flowchart of accessing to-be-processed data according to an embodiment of this disclosure.

For ease of understanding, FIG. 11 is a flowchart of accessing to-be-processed data according to an embodiment of this disclosure. As shown in FIG. 11, a blockchain node in the embodiments of this disclosure is a blockchain node that needs to save full ledger data in a blockchain network. For example, the blockchain node is any blockchain node in the blockchain network shown in FIG. 1. For example, the blockchain node is node 10*a*.

When the blockchain node obtains a service data request, the blockchain node executes step 1101 to obtain a storage instance mapping table, and can then execute step 1102 to determine a second database instance on the basis of a data type of to-be-processed data carried by the service data request.

As shown in FIG. 8 above, in a case that the data type of the to-be-processed data obtained by the blockchain node is the contract data type, the blockchain node obtains the storage instance mapping table. Among the N database instances in the storage instance mapping table, the second database instance is determined. The data type of the second database instance is matched with the to-be-processed data. For example, the second database instance is database instance $D_4$, database instance $D_5$, and database instance $D_6$ shown in FIG. 8.

Further, the blockchain node executes step 1103 to step 1104 to determine position information of the to-be-processed data on a hash ring on the basis of a data sharding strategy, then find, according to a storage direction of the hash ring, first position information having closest position information with the position information of the to-beprocessed data, and determine a database instance corresponding to the found first position information to be a service database instance.

In this case, the blockchain node executes step 1105 to determine whether the service database instance is deployed in a local database. In a case that the service database instance is deployed in a local database, the blockchain node executes step 1106 to access the to-be-processed data in the local database, and executes step 1107 to end the access flow. For example, if the service database instance is database instance $D_3$ shown in FIG. 3 above, the blockchain node accesses the to-be-processed data on the hard disk drive A in the local database.

In an example, in a case that the service database instance is not deployed in the local database but in a remote database, the blockchain node jumps to step 1108 to step 1111 to: call a database service component to establish a connection between the blockchain node and the remote database, then access the to-be-processed data in the remote database, and return the to-be-processed data to the database service component, so as to cause the database service component to return the to-be-processed data to the blockchain node. The blockchain node then executes step 1107 to end the access flow.

Step 1006: The blockchain node performs a data operation indicated by the service data request on the to-be-processed data.

In an example, the service data request includes a data archiving request, a data change request, a data addition request, a data query request, a data deletion request, and the like. The data archiving request is used for archiving the to-be-processed data when the data type of the to-be-processed data indicates that the to-be-processed data is transaction data. For example, when the service data request is a data archiving request, the blockchain node obtains data information of the to-be-processed data and a data archiving condition for the to-be-processed data. The data archiving condition includes an archiving parameter threshold. The archiving parameter threshold includes at least one of an archiving time range (for example, a time range N years from now) or an archiving frequency threshold (for example, 50 times). The blockchain node determines, in a case that the data information indicates that a transaction time stamp of the to-be-processed data belongs to the archiving time range or an access frequency of the to-be-processed data is less than the archiving frequency threshold, that the to-be-processed data satisfies the data archiving condition. In this case, the blockchain node transfers the to-be-processed data to an archiving database from a database to which the to-be-processed data belongs.

It can be seen that the embodiments of this disclosure are applicable to scenarios that require a blockchain system to store massive data and have high requirements for chain performance, including a scenario of performance pressure caused by a high transaction frequency and a scenario of storage space pressure caused by a large transaction quantity. In combination with the data characteristics of a blockchain, different types of blockchain data are stored on different database instances respectively to solve the bottleneck problem of storage capacity. For example, the embodiments of this disclosure store inactive data such as historical transactions to an archiving database. The archiving database is a device with poor performance and lower costs, which is conducive to processing data such as archiving or regularly deleting data, thereby saving a storage space and expenses. This means that the main database of the blockchain in the embodiments of this disclosure only needs to retain the latest data, thereby reducing the data magnitude of the database and improving the data read-write rate, so as to improve the data access performance. This storage extension method not only addresses the problem of low data read-write performance of the blockchain node, but also addresses the problem of a limited storage space of a single machine. Even through refined contract storage management according to the data types and the data sharding strategy, a possibility of implementation of the blockchain in a storage scenario with a large data volume.

Figure 12:
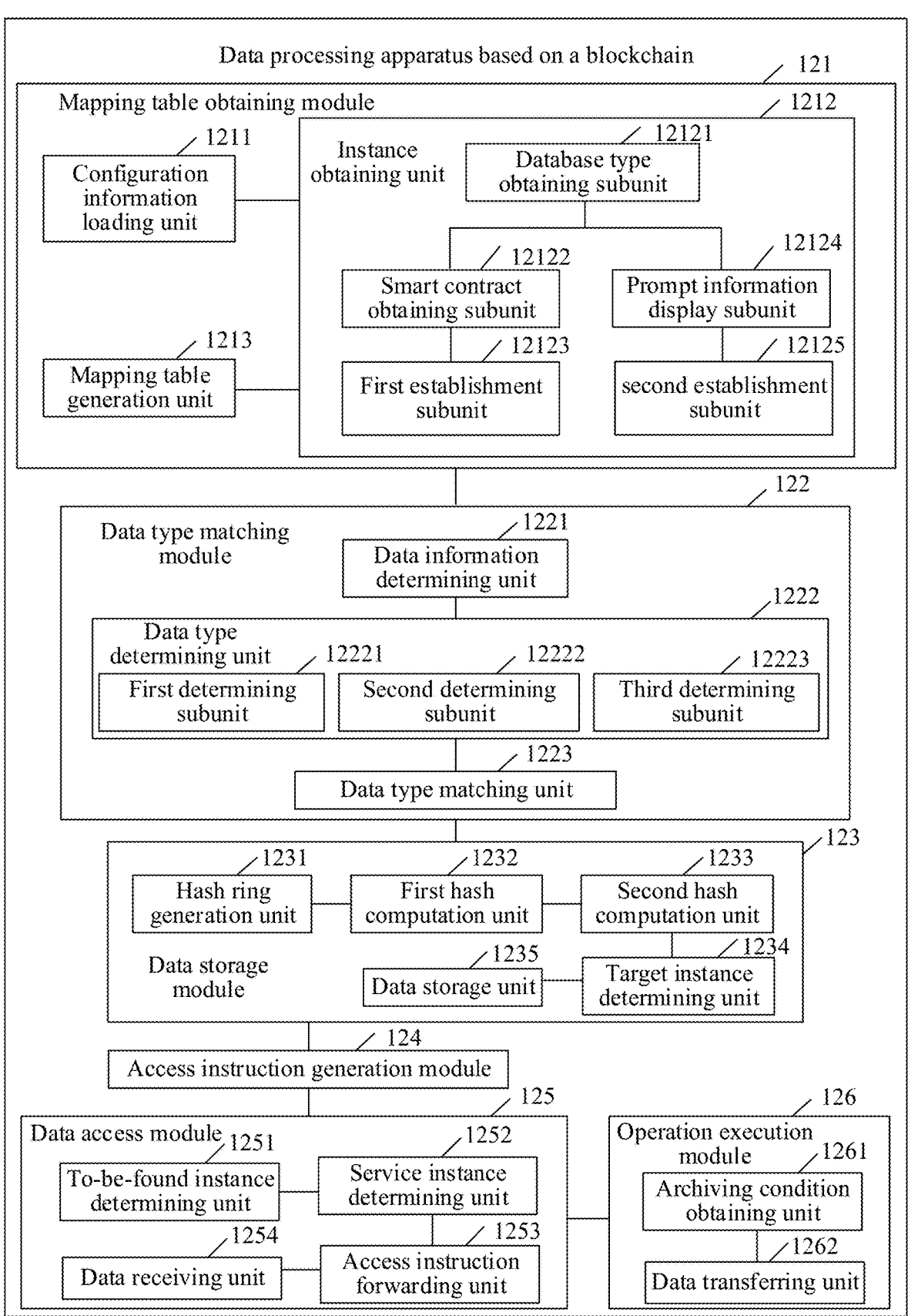
FIG. 12 is a schematic structural diagram of a data processing apparatus based on a blockchain according to an embodiment of this disclosure.

Further, referring to FIG. 12, FIG. 12 is a schematic structural diagram of a data processing apparatus based on a blockchain according to an embodiment of this disclosure. As shown in FIG. 12, the data processing apparatus 1 based on the blockchain is a computer program (including program codes) run on a computer device. For example, the data processing apparatus 1 based on the blockchain is application software. The data processing apparatus based on the blockchain can be configured to execute the corresponding steps in the method provided in the embodiments of this disclosure. As shown in FIG. 12, the data processing apparatus based on the blockchain is run on a blockchain node that needs to save full ledger data in a blockchain network. For example, the blockchain node is any blockchain node in the blockchain network shown in FIG. 1. For example, the blockchain node is node 10*a*. The data processing apparatus based on the blockchain includes: a mapping table obtaining module 121, a data type matching module 122, a data storage module 123, an access instruction generation module 124, a data access module 125, and an operation execution module 126.

The mapping table obtaining module 121 is configured to obtain a storage instance mapping table on the basis of database configuration information of the blockchain node, the storage instance mapping table including data mapping relationships of N database instances, the data mapping relationships indicating data types of the database instances, and N is a positive integer greater than 1.

In an example, the mapping table obtaining module 121 includes: a configuration information loading unit 1211, an instance obtaining unit 1212, and a mapping table generation unit 1213.

The configuration information loading unit 1211 is configured to: in response to a starting operation performed on the blockchain node, load the database configuration information in a case that the starting operation indicates that the blockchain node is started for the first time.

The instance obtaining unit 1212 is configured to establish the N database instances on the basis of the database configuration information and a database type of a main database of the blockchain node.

In an example, storage path information in the database configuration information indicates a hard disk drive set associated with X data types, and X is a positive integer.

The instance obtaining unit 1212 includes: a database type obtaining subunit 12121, a smart contract obtaining subunit 12122, a first establishment subunit 12123, a prompt information display subunit 12124, and a second establishment subunit 12125.

The database type obtaining subunit 12121 is configured to obtain the database type of the main database of the blockchain node.

The smart contract obtaining subunit 12122 is configured to obtain, in a case that the database type of the blockchain node belongs to the first type, the smart contract from the blockchain to which the blockchain node belongs, the smart contract being used for establishing database instances.

The first establishment subunit 12123 is configured to respectively establish a database instance for each hard disk drive in the hard disk drive set on the basis of the smart contract to obtain the N database instances.

The first establishment subunit 12123 is further configured to determine, for each hard disk drive in the hard disk drive set, an instance quantity of the hard disk drive on the basis of the database configuration information. The first establishment subunit 12123 is configured to establish, on the basis of the smart contract in a case that the hard disk drive is deployed in a local database in the main database, the database instance corresponding to the instance quantity for the hard disk drive. The first establishment subunit 12123 is further configured to call a database service component in a case that the hard disk drive is deployed in a remote database in the main database, and establish, on the basis of the smart contract, the database instance corresponding to the instance quantity for the hard disk drive, the database service component being configured to provide a remote database service.

The prompt information display subunit 12124 is configured to display, in a case that the database type belongs to a second type, prompt information associated with the database configuration information.

The second establishment subunit 12125 is configured to respectively establish a database instance for each hard disk drive in the hard disk drive set in response to a triggering operation performed on the prompt information to obtain the N database instances.

For exemplary implementations of the database type obtaining subunit 12121, the smart contract obtaining subunit 12122, the first establishment subunit 12123, the prompt information display subunit 12124, and the second establishment subunit 12125, reference may be made to the descriptions of establishing the database instances in the embodiment of FIG. 6 above. Details will be omitted here.

The X data types include at least one of a first data type, a second data type, or a third data type. The first data type includes a block header data type. The second data type includes a transaction data type. The third data type includes a contract data type. Storage performance of a hard disk drive of the first data type is lower than storage performance of a hard disk drive of the second data type; and the storage performance of the hard disk drive of the first data type is lower than storage performance of a hard disk drive of the third data type.

The mapping table generation unit 1213 is configured to: build a mapping relationship between each database instance and a data type of a hard disk drive to which each database instance belongs, and generate the storage instance mapping table on the basis of the mapping relationship.

For exemplary implementations of the configuration information loading unit 1211, the instance obtaining unit 1212, and the mapping table generation unit 1213, reference may be made to the description of step 601 in the embodiment of FIG. 6 above. Details will be omitted here.

The data type matching module 122 is configured to determine M candidate database instances from the N database instances in a case that to-be-stored blockchain data has been obtained, data types of the candidate database instances being matched with the blockchain data, and M being a positive integer less than or equal to N.

The data type matching module 122 includes: a data information determining unit 1221, a data type determining unit 1222, and a data type matching unit 1223.

The data information determining unit 1221 is configured to determine data information of the blockchain data in a case that the to-be-stored blockchain data has been obtained.

The data type determining unit 1222 is configured to determine a data type of the blockchain data on the basis of the data information of the blockchain data.

The database configuration information includes a data volume threshold and an access frequency threshold.

The data type determining unit 1222 includes: a first determining subunit 12221, a second determining subunit 12222, and a third determining subunit 12223.

The first determining subunit 12221 is configured to determine the first data type to be the data type of the blockchain data in a case that the data information indicates that a data volume of the blockchain data does not reach the data volume threshold and a data access frequency of the blockchain data reaches the access frequency threshold.

The second determining subunit 12222 is configured to determine the second data type to be the data type of the blockchain data in a case that the data information indicates that the blockchain data belongs to transaction data.

The third determining subunit 12223 is configured to determine the third data type to be the data type of the blockchain data in a case that the data information indicates that the blockchain data belongs to contract data.

For exemplary implementations of the first determining subunit 12221, the second determining subunit 12222, and the third determining subunit 12223, reference may be made to the description of the data type in the embodiment of FIG. 6 above. Details will be omitted here.

The data type matching unit 1223 is configured to: search the storage instance mapping table for a data type matched with the data type of the blockchain data, and determine database instances corresponding to the found data type to be the candidate database instances.

For exemplary implementations of the data information determining unit 1221, the data type determining unit 1222, and the data type matching unit 1223, reference may be made to the description of step 601 in the embodiment corresponding to FIG. 6 above. Details will be omitted here.

The data storage module 123 is configured to store the blockchain data to a first database instance among the M candidate database instance on the basis of a data sharding strategy in the database configuration information.

The data storage module 123 includes: a hash ring generation unit 1231, a first hash computation unit 1232, a second hash computation unit 1233, a target instance determining unit 1234, and a data storage unit 1235.

The hash ring generation unit 1231 is configured to generate, from a hash value space according to a storage direction on the basis of the data sharding strategy, a hash ring associated with the data type of the blockchain data.

The first hash computation unit 1232 is configured to performs hash computation on first key information of each of the M candidate database instances to obtain first position information of each candidate database instance on the hash ring.

The second hash computation unit 1233 is configured to perform hash computation on second key information of the blockchain data to obtain second position information of the blockchain data on the hash ring.

The target instance determining unit 1234 is configured to: search, on the basis of the second position information, the hash ring along the storage direction for first position information having a closest position relationship with the second position information, and determine a database instance corresponding to the found first position information to be the first database instance.

The data storage unit 1235 is configured to store the blockchain data to the first database instance.

For exemplary implementations of the hash ring generation unit 1231, the first hash computation unit 1232, the second hash computation unit 1233, the target instance determining unit 1234, and the data storage unit 1235, reference may be made to the description of step 603 in the embodiment of FIG. 6 above. Details will be omitted here.

The blockchain data includes to-be-processed data.

The access instruction generation module 124 is configured to generate a data access instruction in response to a service data request for the to-be-processed data, the data access instruction being used for accessing the to-be-processed data.

The data access module 125 is configured to: determine a second database instance from the N database instances, and access the to-be-processed data from the second database instance on the basis of the data access instruction and the data sharding strategy, a data type of the second database instance being matched with the to-be-processed data.

The N database instances are deployed in a remote database associated with the blockchain node. The remote database includes a host cluster corresponding to X data types. X is a positive integer. One data type corresponds to one host cluster.

The data access module 125 includes: a to-be-found instance determining unit 1251, a service instance determining unit 1252, an access instruction forwarding unit 1253, and a data receiving unit 1254.

The to-be-found instance determining unit 1251 is configured to: determine a target host cluster from the X host clusters, and determine a database instance deployed in the target host cluster to be the second database instance, a data type of the target host cluster being matched with the to-be-processed data.

The service instance determining unit 1252 is configured to determine, from the second database instance on the basis of the data sharding strategy, a service database instance to which the to-be-processed data belongs.

The access instruction forwarding unit 1253 is configured to forward the data access instruction to a database agent having a network connection relationship with the blockchain node to cause the database agent to transmit the data access instruction to a database host node deployed by the service database instance.

The data receiving unit 1254 is configured to receive the to-be-processed data returned by the database host node through the database agent.

For exemplary implementations of the to-be-found instance determining unit 1251, the service instance determining unit 1252, the access instruction forwarding unit 1253, and the data receiving unit 1254, reference may be made to the description of step 1005 in the embodiment corresponding to FIG. 10 above. Details will be omitted here.

The operation execution module 126 is configured to perform a data operation indicated by the service data request on the to-be-processed data.

The service data request includes a data archiving request. The data archiving request is used for archiving the to-be-processed data when the data type of the to-be-processed data indicates that the to-be-processed data is transaction data.

The operation execution module 126 includes: an archiving condition obtaining unit 1261 and a data transferring unit 1262.

The archiving condition obtaining unit 1261 is configured to obtain data information of the to-be-processed data and a data archiving condition for the to-be-processed data. The data archiving condition includes an archiving parameter threshold. The archiving parameter threshold including at least one of an archiving time range or an archiving frequency threshold.

The data transferring unit 1262 is configured to: determine, in a case that the data information indicates that a transaction time stamp of the to-be-processed data belongs to the archiving time range or an accessing frequency of the to-be-processed data is less than the archiving frequency threshold, that the to-be-processed data satisfies the data archiving condition, and transfer the to-be-processed data to an archiving database from a database to which the to-be-processed data belongs.

For exemplary implementations of the an archiving condition obtaining unit 1261 and the data transferring unit 1262, reference may be made to the description of step 1006 in the embodiment corresponding to FIG. 10 above. Details will be omitted here.

For exemplary implementations of the mapping table obtaining module 121, the data type matching module 122, the data storage module 123, the access instruction generation module 124, the data access module 125, and the operation execution module 126, reference may be made to the descriptions of step 1001 to step 1006 in the embodiment of FIG. 10 above. Details will be omitted here. In addition, the description of beneficial effects of the same method are not described herein again.

Figure 13:
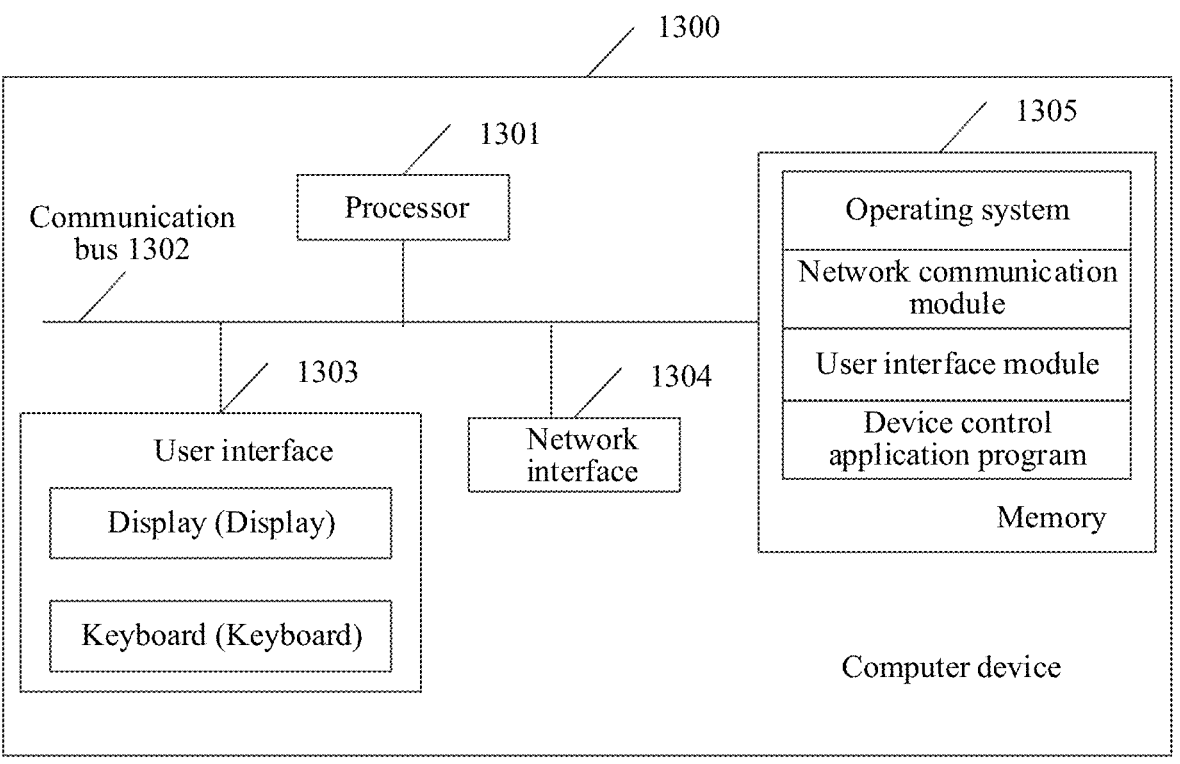
FIG. 13 is a schematic structural diagram of a computer device according to an embodiment of this disclosure.

Further, FIG. 13 is a schematic diagram of a computer device according to an embodiment of this disclosure. As shown in FIG. 13, the computer device 1300 can be is a blockchain node that needs to save full ledger data in a blockchain network. For example, the blockchain node is any blockchain node in the blockchain network shown in FIG. 1. For example, the blockchain node is node 10a. The computer device 1300 may include: at least one processor 1301, for example, processing circuitry such as a central processing unit (CPU), at least one network interface 1304, a user interface 1303, a memory 1305, and at least one communications bus 1302. The communications bus 1302 is configured to implement connection and communication between these components. The user interface 1303 may include a display and a keyboard. The user interface 1304 may include a standard wired interface and wireless interface (such as a WI-FI interface). The memory 1305 may be a high-speed RAM memory, or may be a non-volatile memory (non-volatile memory), for example, at least one magnetic disk memory. The memory 1305 may be at least one storage apparatus located remotely from the foregoing processor 1301. As shown in FIG. 13, the memory 1305 used as a computer storage medium may include an operating system, a network communications module, a user interface module, and a device-control application program.

In the computer device 1300 shown in FIG. 13, the network interface 1304 is mainly used for network communication. The user interface 1303 is mainly used for providing an inputting port for a user. The processor 1301 may be configured to invoke a device control application program stored in the memory 1305 to perform the following operations:

obtaining a storage instance mapping table on the basis of database configuration information of the blockchain node, the storage instance mapping table including data mapping relationships of N database instances, the data mapping relationships indicating data types of the database instances, and N being a positive integer greater than 1;

determining M candidate database instances from the N database instances in a case that to-be-stored blockchain data has been obtained, data types of the candidate database instances being matched with the blockchain data, and M being a positive integer less than or equal to N; and storing the blockchain data to a first database instance among the M candidate database instance on the basis of a data sharding strategy in the database configuration information.

It is understood that the computer device 1300 described in the embodiments of this disclosure can execute the descriptions of the foregoing data processing method based on the blockchain in the embodiments corresponding FIG. 6 and FIG. 13, as well as the descriptions of the foregoing data processing apparatus based on the blockchain in the embodiment corresponding to FIG. 12. Details will be omitted here. In addition, the description of beneficial effects of the same method are not described herein again.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The embodiments of this disclosure further provide a computer-readable storage medium, such as a non-transitory computer-readable storage medium. The computer-readable storage medium stores a computer program, and the computer program includes program instructions. The program instructions, when executed by a processor, implement the data processing method based on the blockchain provided by all the steps in FIG. 6 and FIG. 10. Refer to the implementations provided by all the steps of FIG. 6 and FIG. 10. Details will be omitted here.

The computer-readable storage medium can be an internal storage unit of the data processing apparatus or computer device provided by any of the aforementioned embodiments, for example, a hard disk drive or an internal memory of the computer device. The computer-readable storage medium can also be an external storage device of the computer device, such as a plug-in hard disk drive, smart media card (SMC), a secure digital (SD) card, and a flash card, provided on the computer device. Further, the computer-readable storage medium can also include both the internal storage unit of the computer device and the external storage device. The computer-readable storage medium can also be configured to store the computer program and other programs and data required by the computer device. The computer-readable storage medium can also be configured to temporarily store data that has been or will be output.

The embodiments of this disclosure further provide a computer program product. The computer program product includes a computer program. The computer program is stored in a computer-readable storage medium. A processor of a computer device reads the computer program from the computer-readable storage medium and executes the computer program, causing the computer device to perform the foregoing data processing method based on the blockchain in the various embodiments. Details will be omitted here. In addition, the description of beneficial effects of the same method are not described herein again.

What is disclosed above is merely exemplary embodiments of this disclosure, and certainly is not intended to limit the scope of this disclosure. Therefore, equivalent variations shall fall within the scope of this disclosure.

What is claimed is:

1. A data processing method, comprising:
establishing a plurality of database instances based on database configuration information of a blockchain node;
generating a mapping relationship between each of the plurality of database instances and a data type of a hard disk drive associated with the respective database instance;
generating storage instance mapping information based on the mapping relationships, the storage instance mapping information indicating the mapping relationships between the plurality of database instances and the data types of the plurality of database instances;
determining at least one candidate database instance from the plurality of database instances when blockchain data is received, the data type of each of the at least one candidate database instance being matched with a data type of the blockchain data; and
storing the blockchain data to a first database instance of the at least one candidate database instance that is located in a memory based on (i) a data sharding strategy in the database configuration information that is used to generate a hash ring corresponding to the blockchain data and the at least one candidate database instance, (ii) first position information indicating a first position of each of the at least one candidate database instance in the hash ring, and (iii) second position information indicating a second position of the blockchain data in the hash ring, wherein
the first position of the first database instance of the at least one candidate database instance among the first positions of the at least one candidate database instance in the hash ring is closest to the second position of the blockchain data in the hash ring.

2. The method according to claim 1, wherein the establishing, the generating the mapping relationship, and generating the storage instance mapping information are performed when the blockchain node is started for a first time.

3. The method according to claim 1, wherein
the database configuration information includes storage path information, the storage path information indicating a hard disk drive set associated with at least one data type; and
the establishing the plurality of database instances based on the database configuration information comprises:
obtaining a database type of a main database of the blockchain node,
obtaining, based on the database type being of a first type, a smart contract from a blockchain of the blockchain node, and
respectively establishing a database instance for each hard disk drive in the hard disk drive set based on the smart contract to obtain the plurality of database instances.

4. The method according to claim 3, wherein
the at least one data type includes at least one of a first data type, a second data type, or a third data type, the first data type is a block header data type, the second data type is a transaction data type, and the third data type is a contract data type;
storage performance of the hard disk drive of the first data type is lower than storage performance of the hard disk drive of the second data type; and
the storage performance of the hard disk drive of the first data type is lower than storage performance of the hard disk drive of the third data type.

5. The method according to claim 3, wherein the respectively establishing the database instance for each hard disk drive in the hard disk drive set based on the smart contract comprises:
determining, for each hard disk drive in the hard disk drive set, a database instance quantity of the respective hard disk drive based on the database configuration information;
establishing, based on the smart contract when the hard disk drive is deployed in a local database in the main database, the database instance corresponding to the database instance quantity for the hard disk drive; and
calling a database service component when the hard disk drive is deployed in a remote database in the main database, and establishing, based on the smart contract, the database instance corresponding to the database instance quantity for the hard disk drive, the database service component being configured to provide a remote database service.

6. The method according to claim 3, comprising:
displaying, based on the database type being a second type, prompt information associated with the database configuration information; and
respectively establishing the database instance for each hard disk drive in the hard disk drive set in response to user input performed based on the prompt information to obtain the plurality of database instances.

7. The method according to claim 1, wherein the determining the at least one candidate database instance comprises:
determining data information of the blockchain data;
determining the data type of the blockchain data based on the data information of the blockchain data; and
searching the storage instance mapping information for the data type of the blockchain data, and determining the at least one candidate database instance based on which of the plurality of database instances correspond to the data type of the blockchain data.

8. The method according to claim 7, wherein the database configuration information includes a data volume threshold and an access frequency threshold; and the determining the data type of the blockchain data comprises:

determining a first data type to be the data type of the blockchain data based on the data information indicating that a data volume of the blockchain data does not reach the data volume threshold and a data access frequency of the blockchain data reaches the access frequency threshold;

determining a second data type to be the data type of the blockchain data based on the data information indicating that the blockchain data is transaction data; and determining a third data type to be the data type of the blockchain data based on the data information indicating that the blockchain data is contract data.

9. The method according to claim 1, wherein the storing the blockchain data to the first database instance comprises:

generating, from a hash value space according to a storage direction based on the data sharding strategy, the hash ring associated with the data type of the blockchain data;

respectively performing hash computation on first key information of each of the at least one candidate database instance to obtain the first position information of the respective candidate database instance on the hash ring;

performing hash computation on second key information of the blockchain data to obtain the second position information of the blockchain data on the hash ring;

searching the hash ring along the storage direction for first position information having a closest position relationship with the second position information, and determining the database instance corresponding to the first position information to be the first database instance; and storing the blockchain data to the first database instance.

10. The method according to claim 1, wherein the blockchain data includes to-be-processed data, and the method further comprises:

generating a data access instruction in response to a service data request for the to-be-processed data;

determining a second database instance from the plurality of database instances, and accessing the to-be-processed data from the second database instance based on the data access instruction and the data sharding strategy, a data type of the second database instance being matched with the data type of the to-be-processed data; and performing a data operation indicated by the service data request on the to-be-processed data.

11. The method according to claim 10, wherein the plurality of database instances are deployed in a remote database associated with the blockchain node;

the remote database includes a host cluster for each of the data types of the plurality of database instances;

the determining the second database instance comprises:

determining a target host cluster from the plurality of host clusters, and determining the database instance deployed in the target host cluster to be the second database instance, the data type of the target host cluster being matched with the data type of to-be-processed data; and the accessing the to-be-processed data from the second database instance comprises;

determining, from the second database instance based on the data sharding strategy, a service database instance associated with the to-be-processed data;

sending the data access instruction to a data host node deployed by the service database instance via a database agent having a network connection relationship with the blockchain node, and receiving the to-be-processed data from the database host node via the database agent.

12. The method according to claim 10, wherein the service data request includes a data archiving request, the data archiving request is used for archiving the to-be-processed data when the to-be-processed data is transaction data; and the performing the data operation indicated by the service data request comprises:

obtaining data information of the to-be-processed data and a data archiving condition of the to-be-processed data, the data archiving condition including an archiving parameter threshold, and the archiving parameter threshold including at least one of an archiving time range or an archiving frequency threshold, and determining, based on the data information indicating that a transaction time stamp of the to-be-processed data belongs to the archiving time range or an accessing frequency of the to-be-processed data is less than the archiving frequency threshold, that the to-be-processed data satisfies the data archiving condition, and transferring the to-be-processed data to an archiving database.

13. A data processing apparatus including processing circuitry and a first memory storing instructions which, when executed by the processing circuitry, cause the processing circuitry to perform:

establishing a plurality of database instances based on database configuration information of a blockchain node;

generating a mapping relationship between each of the plurality of database instances and a data type of a hard disk drive associated with the respective database instance;

generating storage instance mapping information based on the mapping relationships, the storage instance mapping information indicating the mapping relationships between the plurality of database instances and the data types of the plurality of database instances;

determining at least one candidate database instance from the plurality of database instances when blockchain data is received, the data type of each of the at least one candidate database instance being matched with a data type of the blockchain data; and storing the blockchain data to a first database instance of the at least one candidate database instance that is located in a second memory based on (i) a data sharding strategy in the database configuration information that is used to generate a hash ring corresponding to the blockchain data and the at least one candidate database instance, (ii) first position information indicating a first position of each of the at least one candidate database instance in the hash ring, and (iii) second position information indicating a second position of the blockchain data in the hash ring, wherein the first position of the first database instance of the at least one candidate database instance among the first positions of the at least one candidate database instance in the hash ring is closest to the second position of the blockchain data in the hash ring.

14. The data processing apparatus according to claim 13, wherein the instructions cause the processing circuitry to perform the establishing, the generating the mapping relationship, and the generating the storage instance mapping information when the blockchain node is started for a first time.

15. The data processing apparatus according to claim 13, wherein the database configuration information includes storage path information, the storage path information indicating a hard disk drive set associated with at least one data type; and the instructions cause the processing circuitry to perform:

obtaining a database type of a main database of the blockchain node, obtaining, based on the database type being of a first type, a smart contract from a blockchain of the blockchain node, and respectively establishing a database instance for each hard disk drive in the hard disk drive set based on the smart contract to obtain the plurality of database instances.

16. The data processing apparatus according to claim 15, wherein the at least one data type includes at least one of a first data type, a second data type, or a third data type, the first data type is a block header data type, the second data type is a transaction data type, and the third data type is a contract data type;

storage performance of the hard disk drive of the first data type is lower than storage performance of the hard disk drive of the second data type; and the storage performance of the hard disk drive of the first data type is lower than storage performance of the hard disk drive of the third data type.

17. The data processing apparatus according to claim 15, wherein the instructions cause the processing circuitry to perform:

determining, for each hard disk drive in the hard disk drive set, a database instance quantity of the respective hard disk drive based on the database configuration information;

establishing, based on the smart contract when the hard disk drive is deployed in a local database in the main database, the database instance corresponding to the database instance quantity for the hard disk drive; and calling a database service component when the hard disk drive is deployed in a remote database in the main database, and establishing, based on the smart contract, the database instance corresponding to the database instance quantity for the hard disk drive, the database service component being configured to provide a remote database service.

18. The data processing apparatus according to claim 15, wherein the instructions cause the processing circuitry to perform:

displaying, based on the database type being a second type, prompt information associated with the database configuration information; and respectively establishing the database instance for each hard disk drive in the hard disk drive set in response to user input performed based on the prompt information to obtain the plurality of database instances.

19. The data processing apparatus according to claim 13, wherein the instructions cause the processing circuitry to perform:

determining data information of the blockchain data;

determining the data type of the blockchain data based on the data information of the blockchain data; and searching the storage instance mapping information for the data type of the blockchain data, and determining the at least one candidate database instance based on which of the plurality of database instances correspond to the data type of the blockchain data.

20. A non-transitory computer-readable storage medium, storing instructions which when executed by a processor cause the processor to perform:

establishing a plurality of database instances based on database configuration information of a blockchain node;

generating a mapping relationship between each of the plurality of database instances and a data type of a hard disk drive associated with the respective database instance;

generating storage instance mapping information based on the mapping relationships, the storage instance mapping information indicating the mapping relationships between the plurality of database instances and the data types of the plurality of database instances;

determining at least one candidate database instance from the plurality of database instances when blockchain data is received, the data type of each of the at least one candidate database instance being matched with a data type of the blockchain data; and storing the blockchain data to a first database instance of the at least one candidate database instance that is located in a memory based on (i) a data sharding strategy in the database configuration information that is used to generate a hash ring corresponding to the blockchain data and the at least one candidate database instance, (ii) first position information indicating a first position of each of the at least one candidate database instance in the hash ring, and (iii) second position information indicating a second position of the blockchain data in the hash ring, wherein the first position of the first database instance of the at least one candidate database instance among the first positions of the at least one candidate database instance in the hash ring is closest to the second position of the blockchain data in the hash ring.

* * * * *